(12) United States Patent
Santamarina et al.

(10) Patent No.: US 11,578,584 B2
(45) Date of Patent: Feb. 14, 2023

(54) WELL MONITORING WITH MAGNETIC TOOL

(71) Applicant: KING ABDULLAH UNIVERSITY OF SCIENCE AND TECHNOLOGY, Thuwal (SA)

(72) Inventors: Juan Carlos Santamarina, Thuwal (SA); Qi Liu, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 178 days.

(21) Appl. No.: 17/049,417

(22) PCT Filed: May 2, 2019

(86) PCT No.: PCT/IB2019/053600
§ 371 (c)(1),
(2) Date: Oct. 21, 2020

(87) PCT Pub. No.: WO2019/215551
PCT Pub. Date: Nov. 14, 2019

(65) Prior Publication Data
US 2021/0047913 A1 Feb. 18, 2021

Related U.S. Application Data

(60) Provisional application No. 62/667,880, filed on May 7, 2018.

(51) Int. Cl.
*E21B 47/005* (2012.01)
*E21B 47/092* (2012.01)
*E21B 47/113* (2012.01)

(52) U.S. Cl.
CPC .......... *E21B 47/005* (2020.05); *E21B 47/092* (2020.05); *E21B 47/113* (2020.05)

(58) Field of Classification Search
CPC ...... E21B 47/005; E21B 47/007; E21B 47/01; E21B 47/092; E21B 47/02; E21B 47/022;
(Continued)

(56) References Cited

U.S. PATENT DOCUMENTS 4,491,796 A * 1/1985 Smith ...................... G01V 3/26
324/346
5,306,676 A 4/1994 Johnson
(Continued)

FOREIGN PATENT DOCUMENTS

WO WO-2014144917 A1 * 9/2014 ............. E21B 43/00
WO 2015200789 A1 12/2015
(Continued)

OTHER PUBLICATIONS

Aderibigbe, A., et al., "Application of Magnetic Nanoparticles Mixed with Propping Agents in Enhancing Near-Wellbore Fracture Detection," Journal of Petroleum Science and Engineering, Jan. 19, 2016, vol. 141, pp. 133-143.
(Continued)

*Primary Examiner* — Daniel R Miller
*Assistant Examiner* — Eric Sebastian Von Wald
(74) *Attorney, Agent, or Firm* — Patent Portfolio Builders PLLC

(57) ABSTRACT

A method for investigating well integrity, the method including pumping a magnetic fluid into an annulus of the well; magnetizing with a magnet the magnetic fluid while in the annulus of the well; moving a magnetic sensing probe through a casing of the well and recording a magnetic field generated by the magnetic fluid; and processing the recorded magnetic field to determine a distribution of magnetic particles into the magnetic fluid in the annulus.

16 Claims, 28 Drawing Sheets

(58) Field of Classification Search
CPC ............ E21B 47/0228; E21B 47/0232; E21B 47/024; E21B 47/026; E21B 47/08; E21B 47/085; E21B 47/09; E21B 47/10; E21B 47/113; E21B 33/04; E21B 33/05; G05B 2219/37124; G05B 2219/37185; G05G 2009/04755; G01R 33/0005; G08B 13/2494; Y10S 977/865; G11B 5/842; G11B 5/845; G01L 9/00; F15B 2211/885; F15B 21/065; G01V 2210/1299; G01V 11/005

See application file for complete search history.

(56) References Cited

U.S. PATENT DOCUMENTS

| | | | |
|---|---|---|---|
| 5,436,208 | A | 7/1995 | Johnson |
| 2009/0179649 | A1* | 7/2009 | Schmidt ............... G01V 3/26 324/345 |
| 2014/0239957 | A1 | 8/2014 | Zhang et al. |
| 2015/0137817 | A1* | 5/2015 | Wilson ............... E21B 47/0228 324/333 |
| 2018/0313201 | A1* | 11/2018 | Cromar ............... G01V 1/52 |

FOREIGN PATENT DOCUMENTS

| | | |
|---|---|---|
| WO | 2016209269 A1 | 12/2016 |
| WO | 2017019058 A1 | 2/2017 |

OTHER PUBLICATIONS

Boyce, J.I., et al., "Marine Magnetic Survey of a Submerged Roman Harbour, Caesarea Maritima, Israel," The International Journal of Nautical Archaeology, Mar. 16, 2004, vol. 33, No. 1, pp. 122-136, Blackwell Publishing Ltd.

Broding, R.A., et al., "Magnetic Well Logging," Geophysics, Jan. 1952, vol. XVII, No. 1, pp. 1-26.

Donovan, T.J., et al., "Aeromagnetic Detection of Diagenetic Magnetite over Oil Fields," Geologic Notes, AAPG Bulletin, Feb. 1, 1979, vol. 63, No. 2, pp. 245-248.

International Search Report in corresponding/related International Application No. PCT/IB2019/053600, dated Jul. 24, 2019.

Luyendyk, A.P.J., "Processing of Airborne Magnetic Data," AGSO Journal of Australian Geology and Geophysics, Feb. 1997, vol. 17, No. 2, pp. 31-38.

Maus, S., et al., "Ocean Tidal Signals in Observatory and Satellite Magnetic Measurements," Geophysical Research Letters, Aug. 13, 2004, vol. 31, L15313, pp. 1-4.

Maus, S., et al., "Resolution of Direction of Oceanic Magnetic Lineations by the Sixth-Generation Lithospheric Magnetic Field Model from CHAMP Satellite Magnetic Measurements," Geochemistry, Geophysics, Geosystems, Jul. 25, 2008, vol. 9, No. 7, pp. 1-10, AGU and the Geochemical Society.

Nabighian, M.N., et al., "The Historical Development of the Magnetic Method in Exploration," Geophysics, Nov.-Dec. 2005, vol. 70, No. 6, pp. 33ND-61ND.

Nair, S.D., et al., "Detecting Poor Cement Bonding and Zonal Isolation Problems Using Magnetic Cement Slurries," Society of Petroleum Engineers, Oct. 9, 2017, pp. 1-18.

Silva, J.B.C., et al., "Interpretation of Three-Component Borehole Magnetometer Data," Geophysics, Dec. 1981, vol. 46, No. 12, pp. 1721-1731.

Written Opinion of the International Searching Authority in corresponding/related International Application No. PCT/IB2019/053600, dated Jul. 24, 2019.

* cited by examiner

| MEDIUM | RELATIVE PERMEABILITY |
|---|---|
| Iron (99.95% pure) | 1,000,000 |
| Iron (99.8% pure) | 5,000 |
| Ferritic SS | 1,400 |
| Martensitic SS | 850 |
| Austenitic SS | 1.004 |
| Air | 1.00000037 |
| Superconductors | 0 |

FIG.4

WELL MONITORING WITH MAGNETIC TOOL

CROSS-REFERENCE TO RELATED APPLICATIONS

This application is a U.S. National Stage Application of International Application No. PCT/IB2019/053600, filed on May 2, 2019, which claims priority to U.S. Provisional Patent Application No. 62/667,880, filed on May 7, 2018, entitled "MAGNETIC TOOL FOR WELLBORE MONITORING," the disclosures of which are incorporated herein by reference in their entirety.

BACKGROUND

Technical Field

Embodiments of the subject matter disclosed herein generally relate to monitoring a well, and more specifically, to monitoring the completion of a well in which cement is pumped in the well.

Discussion of the Background

After a well 100 is drilled, a casing 110 needs to be lowered into the wellbore 102 and cemented (with cement 112), as illustrated in FIG. 1. The main objectives of the cementing procedure include (1) to prevent formation erosion, (2) to seal lost-circulation zones, (3) to support the casing, (4) to protect the casing from corrosion, and (5) to isolate hydraulic zones. A poor cement job results in mud channels, especially in eccentric casing conditions as illustrated in FIG. 2A, bad mud 114 removal as illustrated in FIG. 2B, and washed-out boreholes, as illustrated in FIG. 2C. Thus, an evaluation of the cement job is a necessary and useful operation for identifying whether the objectives of the cement job have been achieved. However, the evaluation process remains challenging for the oil/gas industry due to the various reasons now discussed.

The evaluation of the cement job's qualities with the use of logging tools has been a contentious subject for the past few decades. Cement defects that can cause leakage include low top of cement (TOC), mud channels, chimneys and micro-annuli. Current techniques used by industry involve acoustic tools, temperature logging, noise logging, resistivity logging, radioactive logging, etc. These tools are briefly reviewed and their weaknesses are pointed out.

Acoustics and ultrasonic loggings are the standard tools to determine the TOC and measure cement quality, which involves cement bond log, variable density log, ultrasonic pulse-echo, and flexural measurement techniques. Acoustic logs measure indirectly the cement quality. The results are inferred from the degree of acoustic coupling of the cement to the casing and to the formation. This indirect measurement renders this technique not very accurate.

Another class of logging tools involves the noise logging tool, which listens to the noise generated by a fluid flow through a leakage pathway behind the cement casing. The intensity and frequency of the noise depend on the flow rate and the geometry of the leakage pathway, respectively. The use of fiber optics to measure tiny strain events caused by the localized acoustic energy interactions with the fiber cables provides a new way to continuously monitor the entire length of a wellbore. However, difficulties in the interpretation of the signal and poor spatial resolution limits the application of noise logging.

Still another logging tool is temperature based. Temperature logs detect variations in the temperature behind the casing caused by cement hydration or fluid migration. This technique is used to detect the TOC before the end of cement hydration. However, this technique is not able to provide other information about the seal quality of the primary cementing. Radial differential temperature (RDT) logging has been used in field for detecting the flow behind the casing.

Another class of tools is the resistivity logging. Resistivity logging conducts a low-frequency A/C current from one electrode to another along the casing. A small portion of the current leaks from the casing to the cement and formation. The apparent resistivity of the adjacent material can be calculated from the leakage current. However, the accuracy of this method depends on the composition of the underground material around the well and also may be impacted by the type of material from which the casing is made.

Radioactive tracer logging is another class of logging tools. The technique involves using a gamma-ray-emitting radioactive isotope to tag the material placed downhole, and logging measurements are made with a gamma-ray tool to infer the location of the tagged material. This tool has been used for determining flow rates, diagnosing completion problem, and evaluating hydraulic fracture geometry. However, this tool may expose the operator of the tool to radioactive material and also contaminates the soil.

Magnetic sensors have also been used as logging tools. FIG. 3 lists in a table the sensing range of different magnetic sensors. Fluxgate magnetometers (FGMs) are used to measure magnetic fields in a wide range of applications. A fluxgate sensor consists of a core of magnetic materials rapped in a pick-up coil. Changes in the core permeability cause the core field to change, thereby inducing a voltage in the pick-up coil. The measurement range, noise level, and linearity of the FGMs make this type of technique an appropriate sensor to measure the Earth's magnetic field, which is in the range of 0.25 to 0.65 Gauss).

The Superconducting Quantum Interference Device (SQUID) is a very sensitive magnetometer used to measure extremely subtle magnetic fields, based on superconducting loops containing Josephson junctions. The threshold for SQUID is $10^{-14}$ T (the magnetic field of heart and brain is $10^{-10}$ T and $10^{-13}$ T respectively). SQUID is believed to be the best tool for biomagnetic measurements, e.g. heart, brain.

Magnetoresistance (MR) refers to the change in the electrical resistance of a material in response to an applied magnetic flux density. The MR magnetometer has high sensitivity, high temperature tolerance, and low power consumption. MR sensors have been used in commercial applications operating at temperatures of up to 225° C., pressures up to 20,000 psi and mechanical shocks up to 1500 g. Although the magnetic sensors have a good sensitivity, are reliable, and could withstand the high-pressures and high-temperatures that are typically found in a well, the existing logging methods that use this type of sensors are not well developed.

Thus, there is a need to provide a better logging method for determining the various parameters of a cement completion operation.

SUMMARY

According to an embodiment, there is a method for investigating a well integrity. The method includes pumping a magnetic fluid into an annulus of the well; magnetizing with a magnet the magnetic fluid while in the annulus of the well; moving a magnetic sensing probe through a casing of the well and recording a magnetic field generated by the magnetic fluid; and processing the recorded magnetic field to determine a distribution of magnetic particles into the magnetic fluid in the annulus.

According to another embodiment, there is a magnetic probe system for investigating well integrity. The magnetic probe system includes a magnetic probe, a controller, and a cable connecting the magnetic probe to the controller. The magnetic probe includes plural magnetic sensors equally distributed along an external circumference of the magnetic probe.

According to still another embodiment, there is a method for determining a distribution of magnetic particles in an annulus of a well. The method includes measuring with a torpedo probe a magnetic field inside a casing provided in the well; estimating a magnetic field inside an annulus, which is formed between the casing and a wall of the well, the magnetic field being produced by a magnetic fluid in the annulus; applying an inverse algorithm to the estimated magnetic field to calculate a predicted magnetic field inside the casing; minimizing a residual magnetic field between the measured magnetic field inside the casing and the predicted magnetic field; and generating an image of the distribution of the magnetic particles in the magnetic fluid based on the residual magnetic field.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4 illustrates the relative magnetic permeability of various materials;

DETAILED DESCRIPTION

Figure 1:
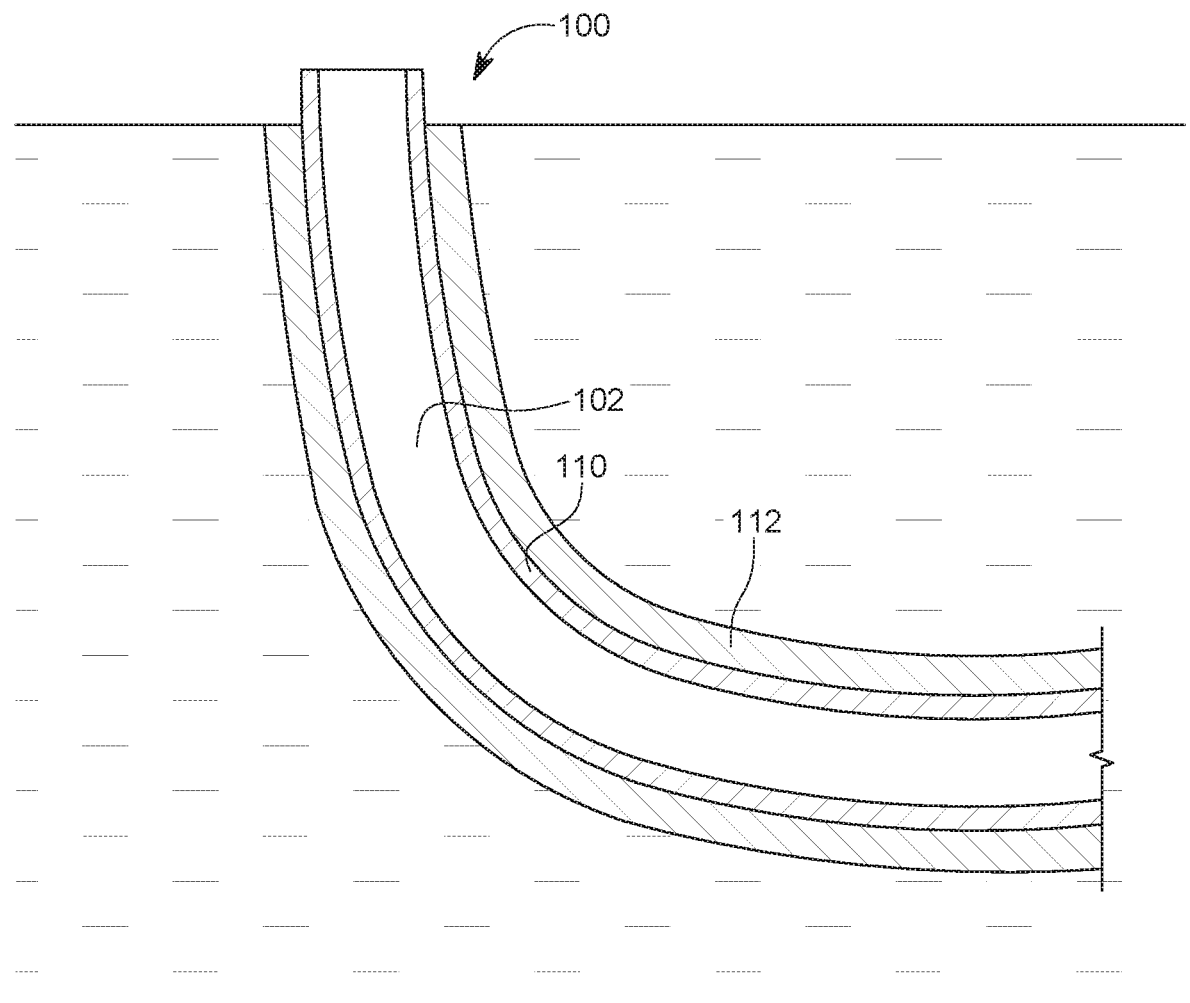
FIG. 1 illustrates a casing that was cemented into a well.
Figure 2A:
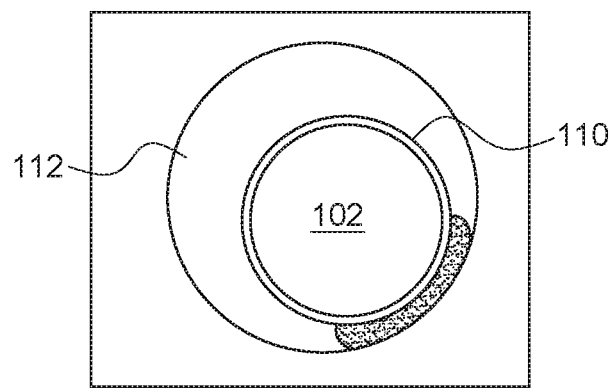
FIGS. 2A to 2C illustrate various problems that develop during a completion operation of the well.
Figure 2B:
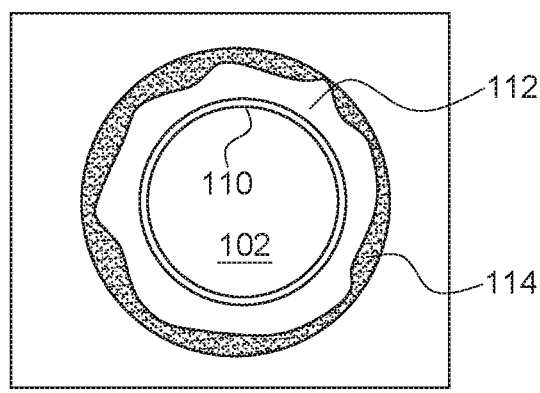
Figure 2C:
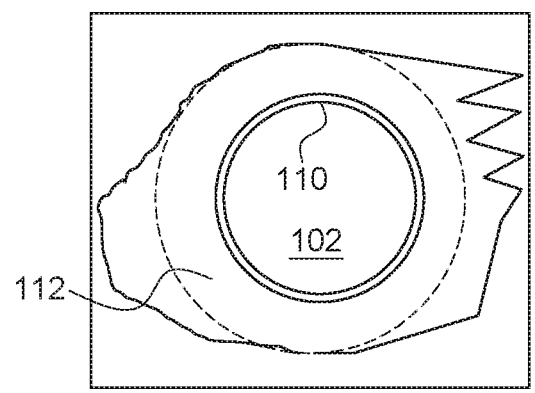
Figure 3:
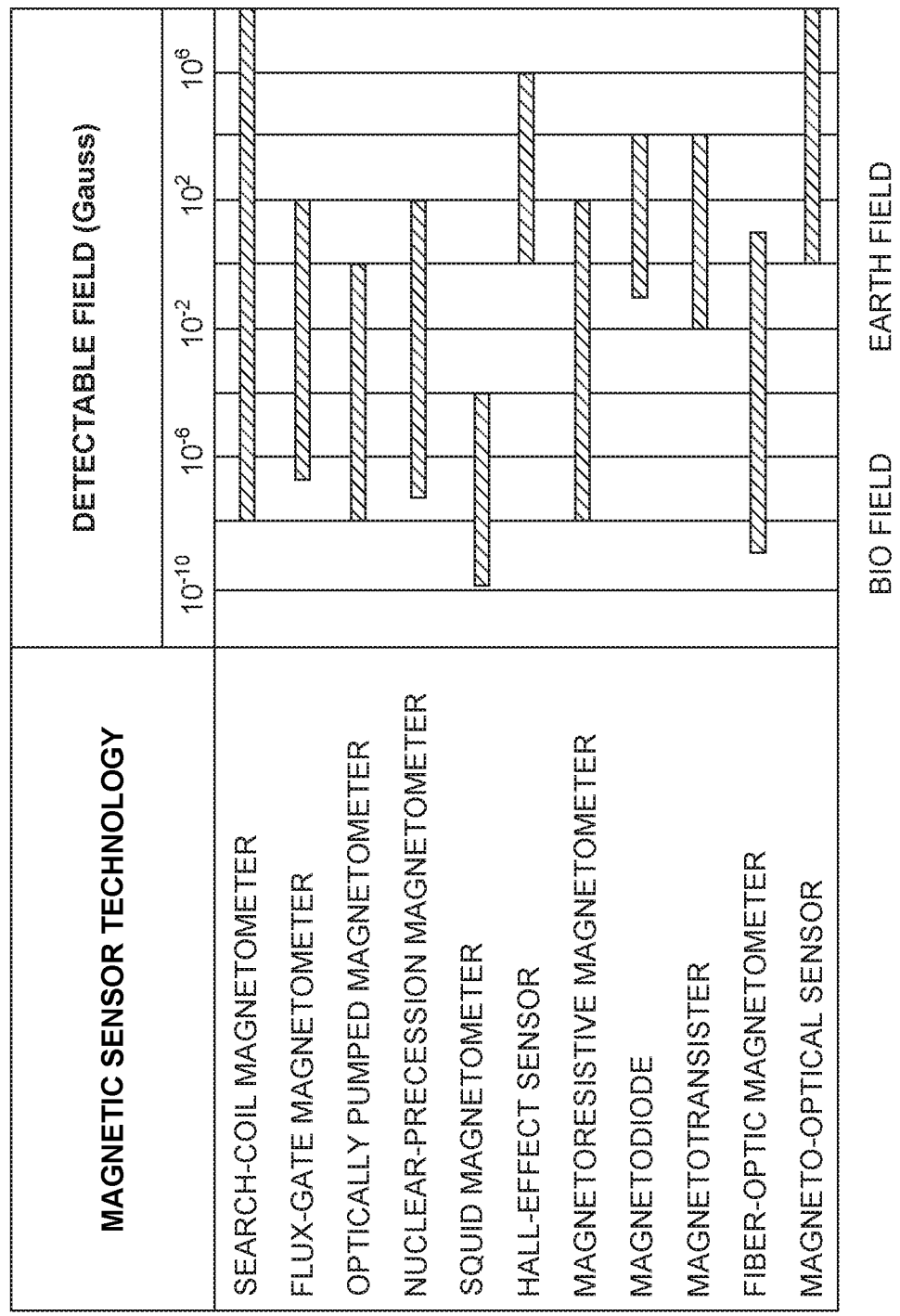
FIG. 3 illustrates the magnetic sensibility of various magnetic sensors.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a magnetic probe that is used inside a well to determine a fracture plane or a layer of non-cement material. However, the methods discussed herein may be used for determining other parameters or characteristics of the well.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, high-resolution magnetic sensors are combined with magnetic drilling fluids/cement, which offer an opportunity to conduct direct measurements of the spatial distribution of ferromagnetic materials in the annular space of cased boreholes. A stable ferromagnetic, water-based drilling mud is developed by adding micro-size ferromagnetic particle to the cement and/or the drilling fluids, and these micro-size ferromagnetic particles act as tracing materials.

To be able to perform magnetic measurements of a magnetic fluid that is present between the casing and the wall of the well, the magnetic field generated inside the casing needs to be able to propagate through the casing. Thus, if the casing is made of a material which has high magnetic permeability, the method would not be able to accurately measure the magnetic field of the magnetic fluid. The propagation of the magnetic field is described by Gauss' law:

$$\nabla \cdot B = 0 \qquad (1).$$

The physical meaning of equation (1) is that the net magnetic flux out of any closed surface is zero. This means that the magnetic field lines generated by a pole of a magnet must terminate on the opposite pole of the magnet and cannot be stopped. However, the magnetic field lines can be redirected. The magnetic field lines prefer to travel through high-magnetic permeability materials. This means that high-magnetic permeability casings provide an easier path for the lines of flux to travel through and act as a screen, which shields the magnetic field both inside and outside. In other words, if the casing is made of a high-magnetic permeability material, the magnetic field emitted by a probe inside the casing, or the magnetic field emitted by the magnetic fluid behind the casing, would rather prefer to travel along the casing than through the casing. Therefore, it would be extremely difficult to conduct any magnetic measurements behind a high-magnetic permeability casing.

Most of the ferroalloys (e.g., carbon steel) have a very high-magnetic permeability. The table in FIG. 4 lists the relative permeability of some common materials. Interestingly, austenitic stainless steel has a relative permeability of 1.004, which is close to the relative permeability of air. Stainless steel is obtained by alloying chromium and nickel with iron, which retains the face-centered lattice even at low temperatures. Because of its unique crystal structure, it has completely different magnetic properties. Most kinds of stainless steel are not magnetic to any appreciable degree.

Figure 5A:
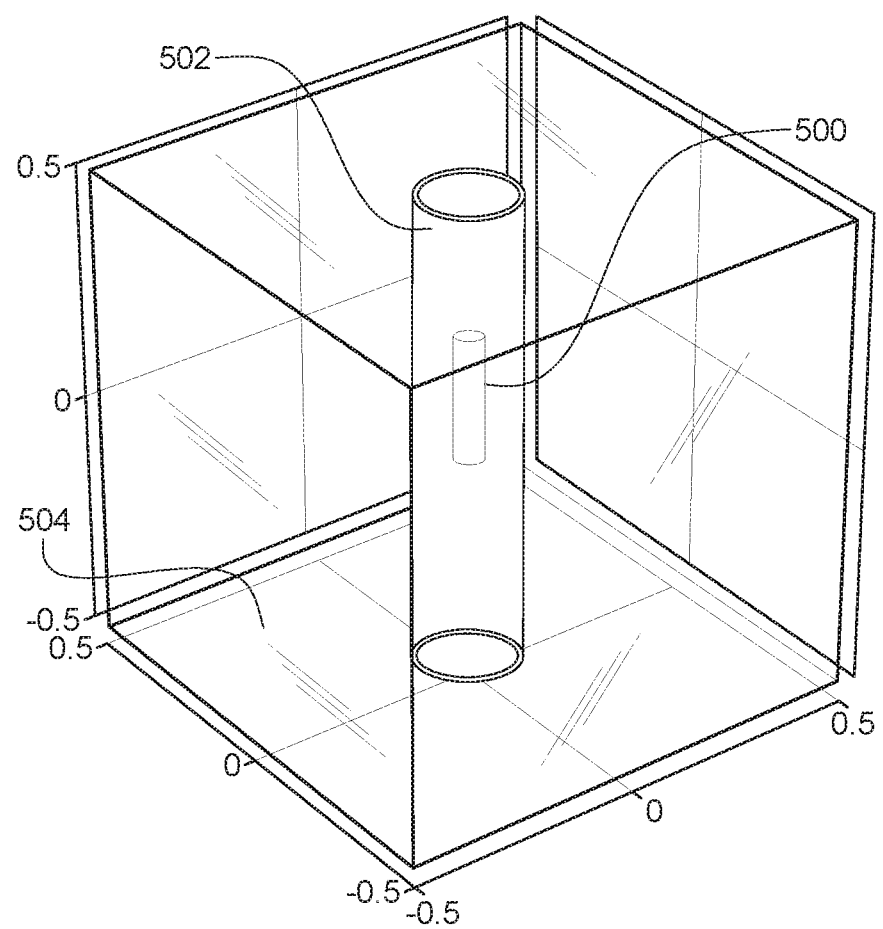
FIGS. 5A to 5C illustrate the magnetic field lines in a casing when a magnet is present inside the casing and the casing is made of various materials.
Figure 5B:
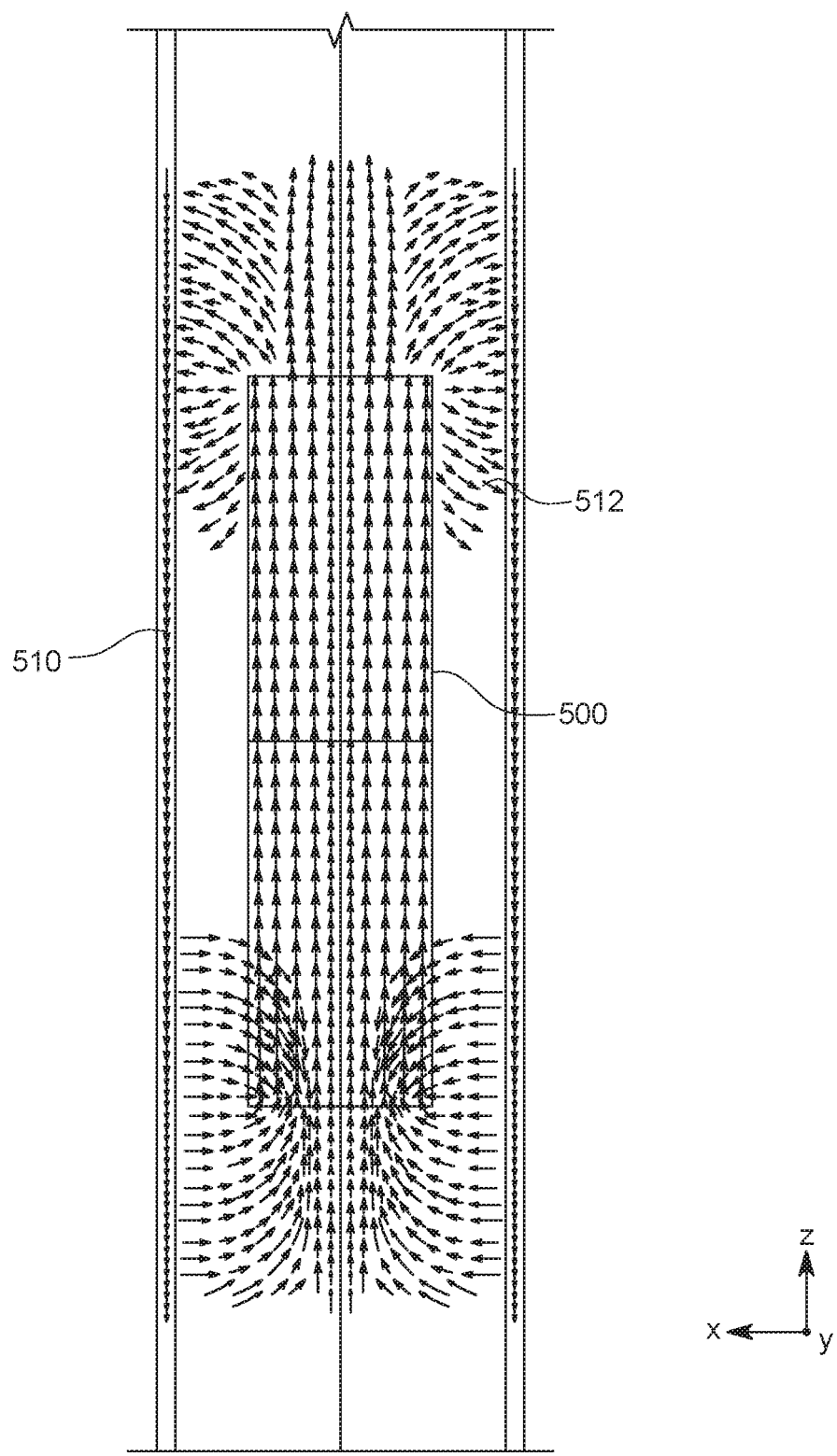
Figure 5C:
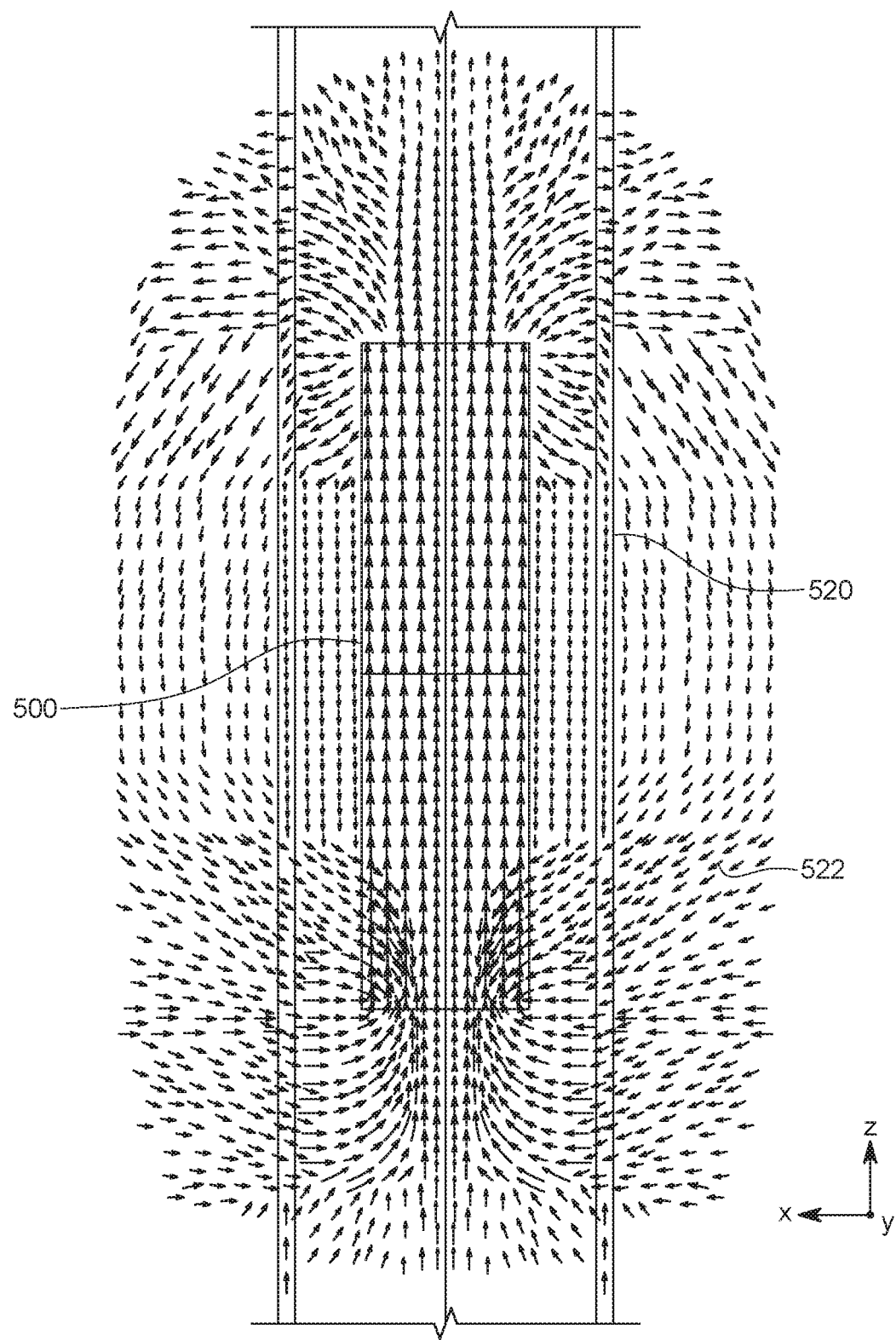

The influence of the casing materials on the magnetic field propagation has been simulated (e.g., with COMSOL Multiphysics). As illustrated in FIG. 5A, a solenoid 500 is installed inside a casing 502 and the casing was placed in air 504. The distribution of the magnetic flux under the influence of an iron casing 510 is shown in FIG. 5B and under the influence of a stainless-steel casing 520 is shown in FIG. 5C. The relative permeability $K_m = \mu_m/\mu_0$ used in the simulation is 5,000 for the iron casing 510 and 1.004 for the stainless steel casing 520.

The simulation results show that all the magnetic field lines 512 from the solenoid 500 prefer to travel entirely through the iron casing 510 due to its high permeability (see FIG. 5B), while the stainless steel casing 520 has a negligible influence on the propagation of the magnetic field 522 and thus, the magnetic lines 522 extend past the casing 520 (see FIG. 5C). In other words, there is substantially no magnetic field escaping from the casing 510 in FIG. 5B (the iron casing acts as a shield), while most of the magnetic field escapes from the stainless steel casing 520 (the stainless steel casing acts as a mesh).

Figure 6:
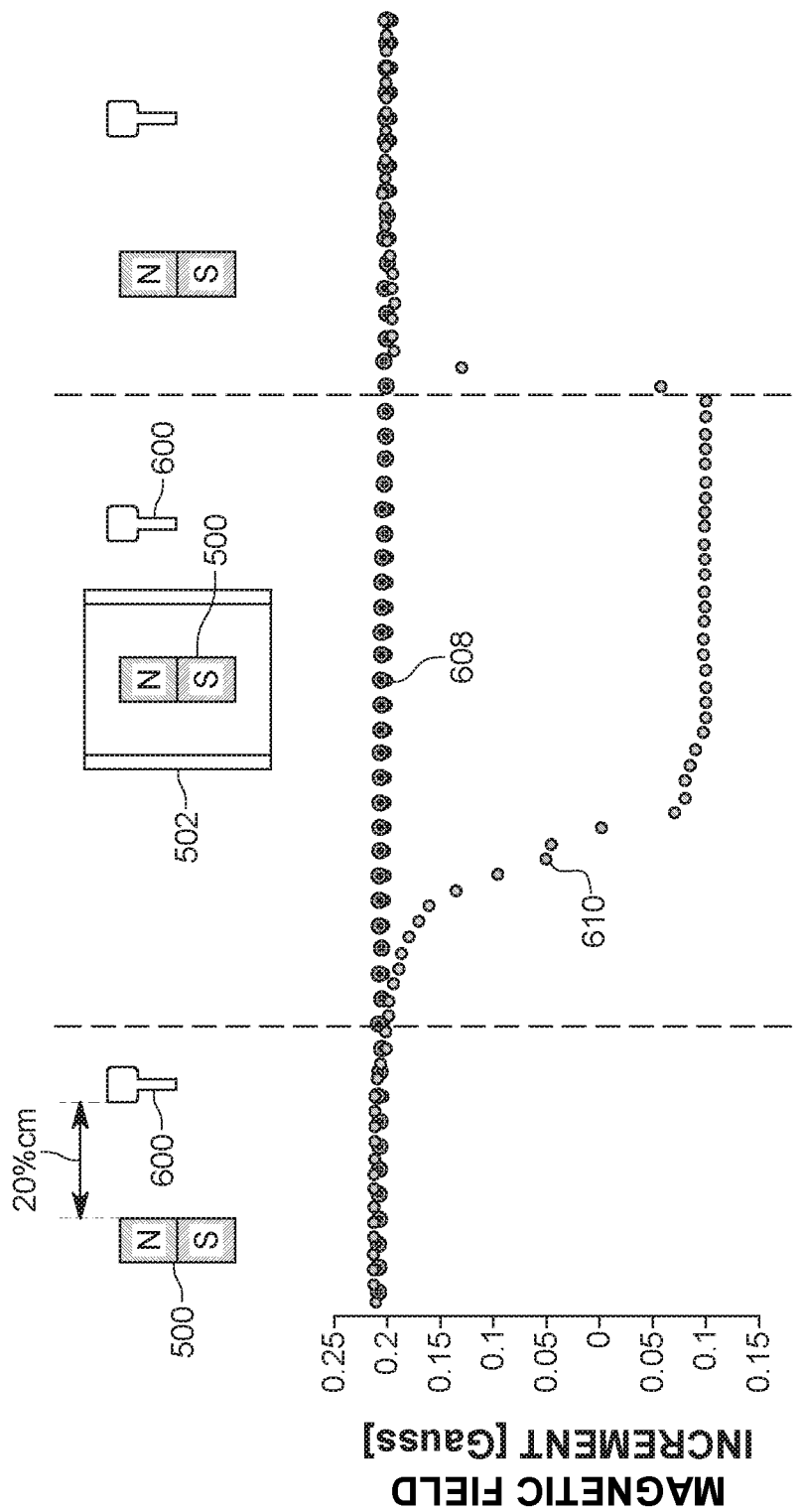
FIG. 6 illustrates the magnetic field measured by a magnetic sensor in the presence of a casing and without the casing.

Laboratory experiments carried out by the inventors, which are illustrated in FIG. 6, validate the simulation results of FIGS. 5B and 5C. A magnetic sensor 600 records the changes in the magnetic field produced by the solenoid 500. When there is no casing between the magnetic sensor 600 and the solenoid 500, the magnetic field has a certain value, as illustrated by curve 608. However, when the solenoid 500 is placed inside a casing 502, the magnetic field measured by the sensor is reduced. For example, if the casing is made of a material that includes plastic or stainless steel, the casing has a negligible influence on the magnetic field strength, as indicated by curve 600. However, if the casing is made of steel pipes, the cashing shields the magnetic field generated by the permanent magnetic, and the measured value of the magnetic field in the presence of this casing is severely reduced, as illustrated by curve 610. Note that the two curves coincide when there is no casing. Thus, the methods to be discussed next assume that the casing is made of a material that has a magnetic permeability smaller than 10, preferably around 1.

Figure 7:
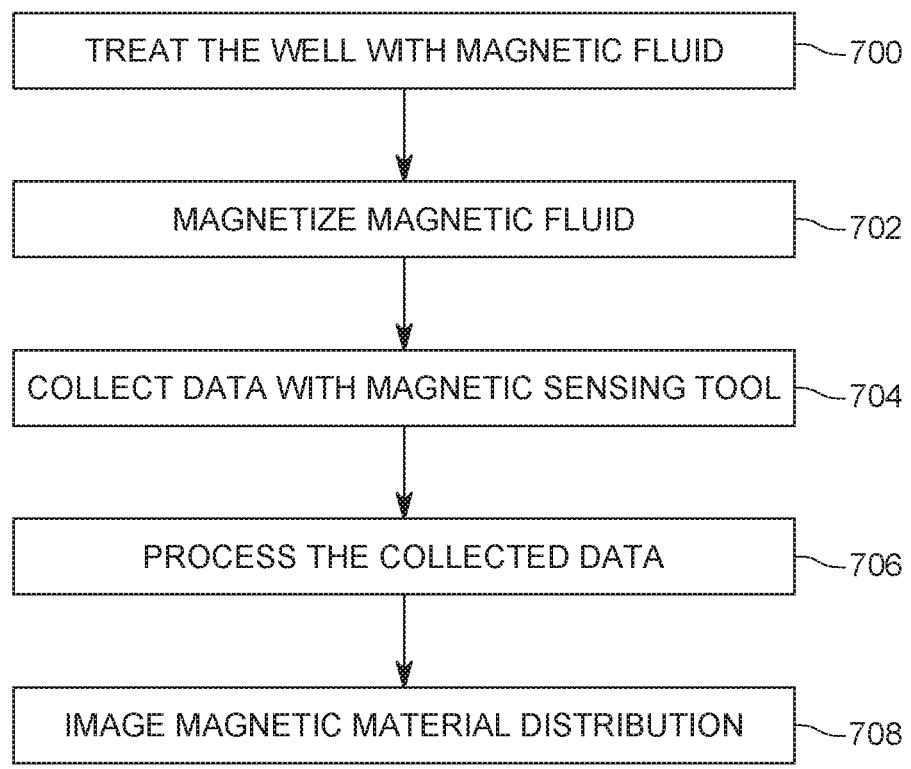
FIG. 7 is a flowchart of a method for determining qualities of a cement completion procedure.

A method for performing magnetic logging inside a casing is now discussed with regard to FIG. 7. The method starts in step 700, in which the well is treated with a magnetic fluid. Any type of the magnetic fluid may be used. In one application, the carrier that takes the magnetic particles of the magnetic fluid down the well can be the drilling fluid or mud used during the drilling of the well. In another applications, the carrier may be the cement itself. The magnetic particles are added to the carrier before being inserted into the well. A pump located at the head of the well may be used to pump the carrier and the magnetic particles into the well. Note that the carrier and the magnetic particles enter into the annulus formed by the casing and the wall of the well either through the most distal end of the casing, or, if the casing has a valve, through the valve. The pump pumps the carrier and the magnetic particles until enough fluid has entered into the annulus between the casing and the wall of the well.

In step 702, the magnetic fluid, which is now located around but outside the casing, is magnetized. For this step, it is possible to use a high-power permanent or electromagnet (called herein the magnet). The magnet is lowered from the head of the well into the casing and it is moved with a constant velocity down the casing to magnetize the magnetic fluid. The magnet is sized to project large magnetic fields into the surrounding geological formations of the casing. For this to happen, the casing needs to have a magnetic permeability smaller than 10, as discussed above.

In step 704, a magnetic sensing tool is run through the bore of the casing for collecting in-situ measurements of the magnetic field exerted by the magnetic fluid. These measurements are then processed in step 706, by applying an inverse algorithm to determine the magnetic material distribution in space, around the casing. Based on the inverse algorithm, an image of the magnetic material distribution is determined in step 708, and the operator of the wellbore can then, based on the image, evaluate the quality of the cementing process.

Figure 8A:
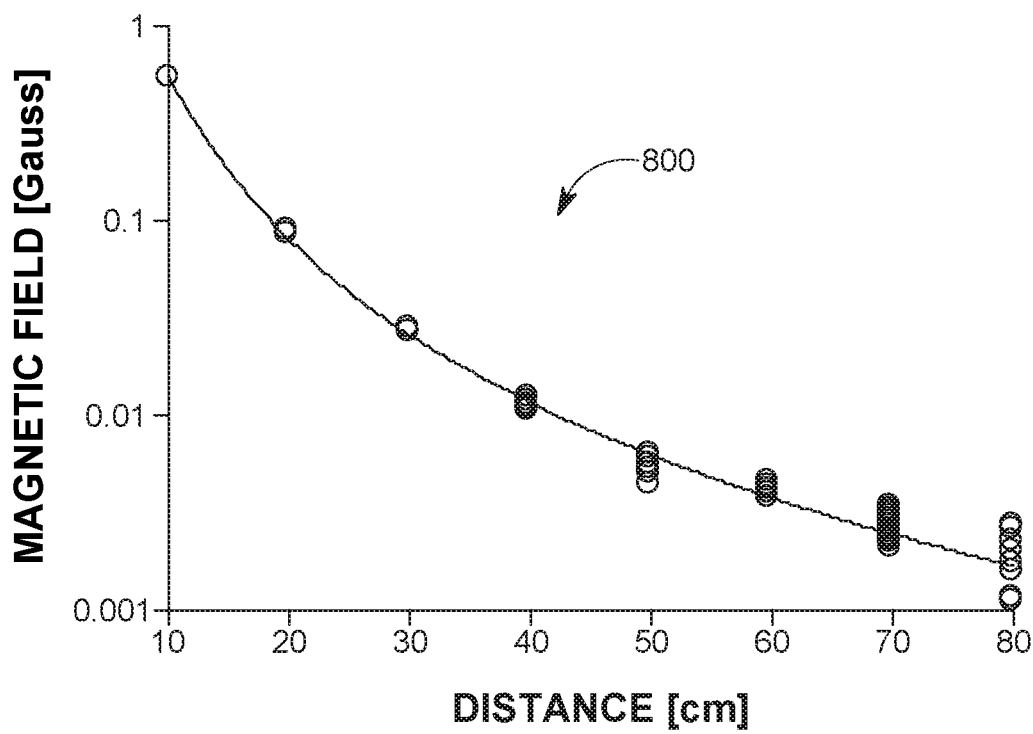
FIGS. 8A to 8D illustrate the sensibility of a magnetic sensor around various directions.
Figure 8B:
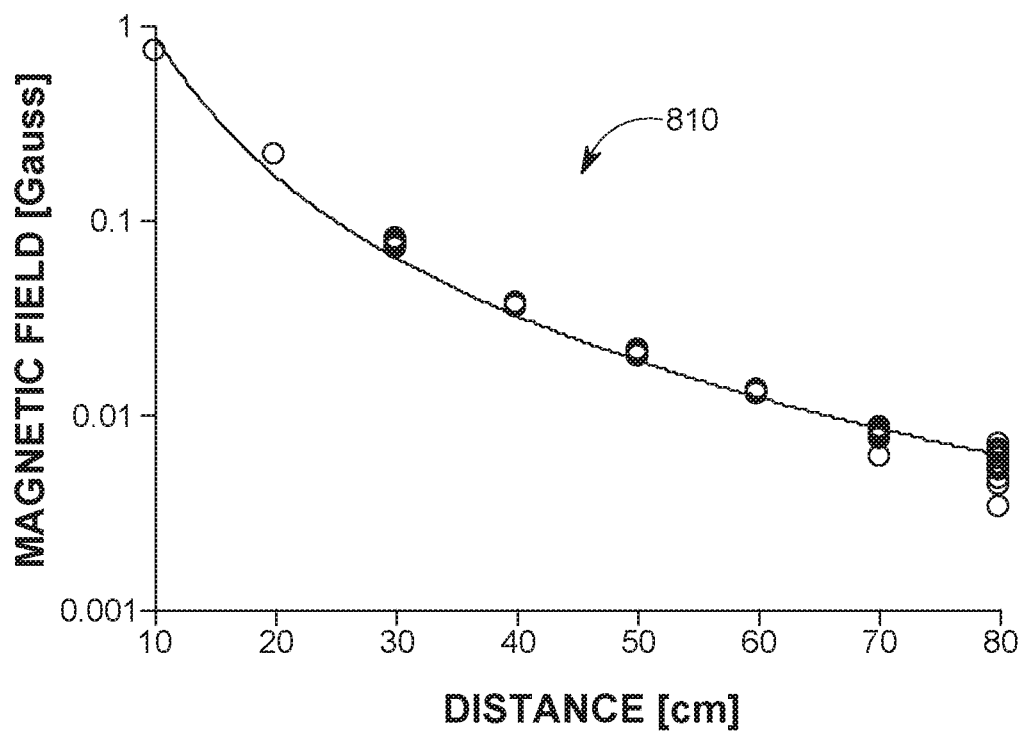
Figure 8C:
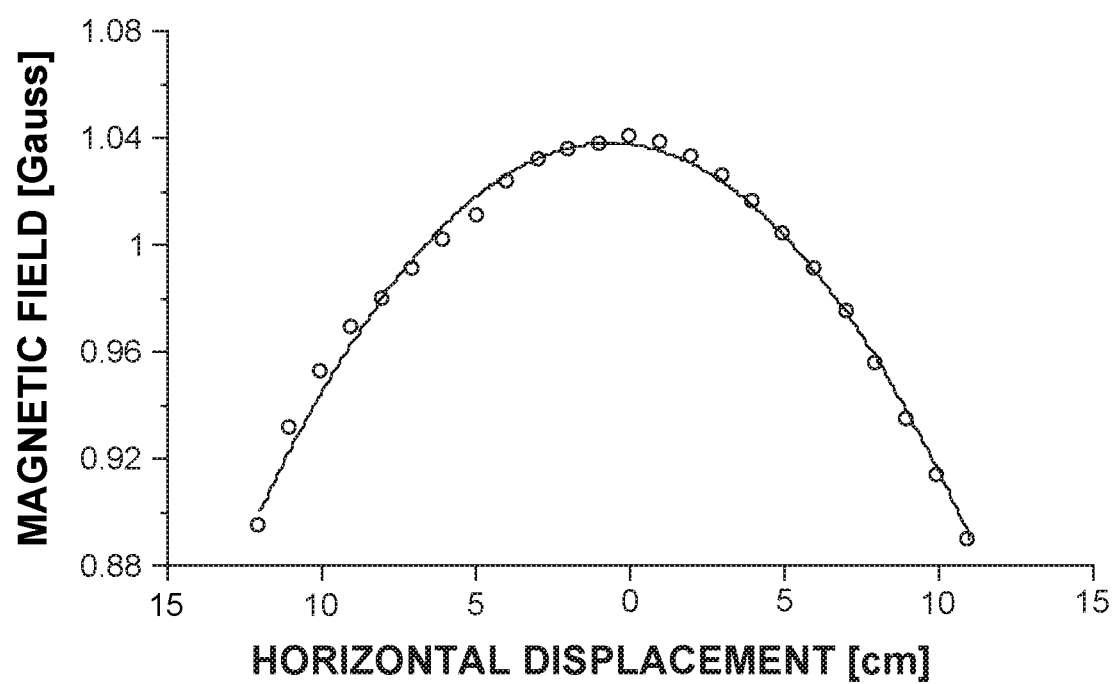
Figure 8D:
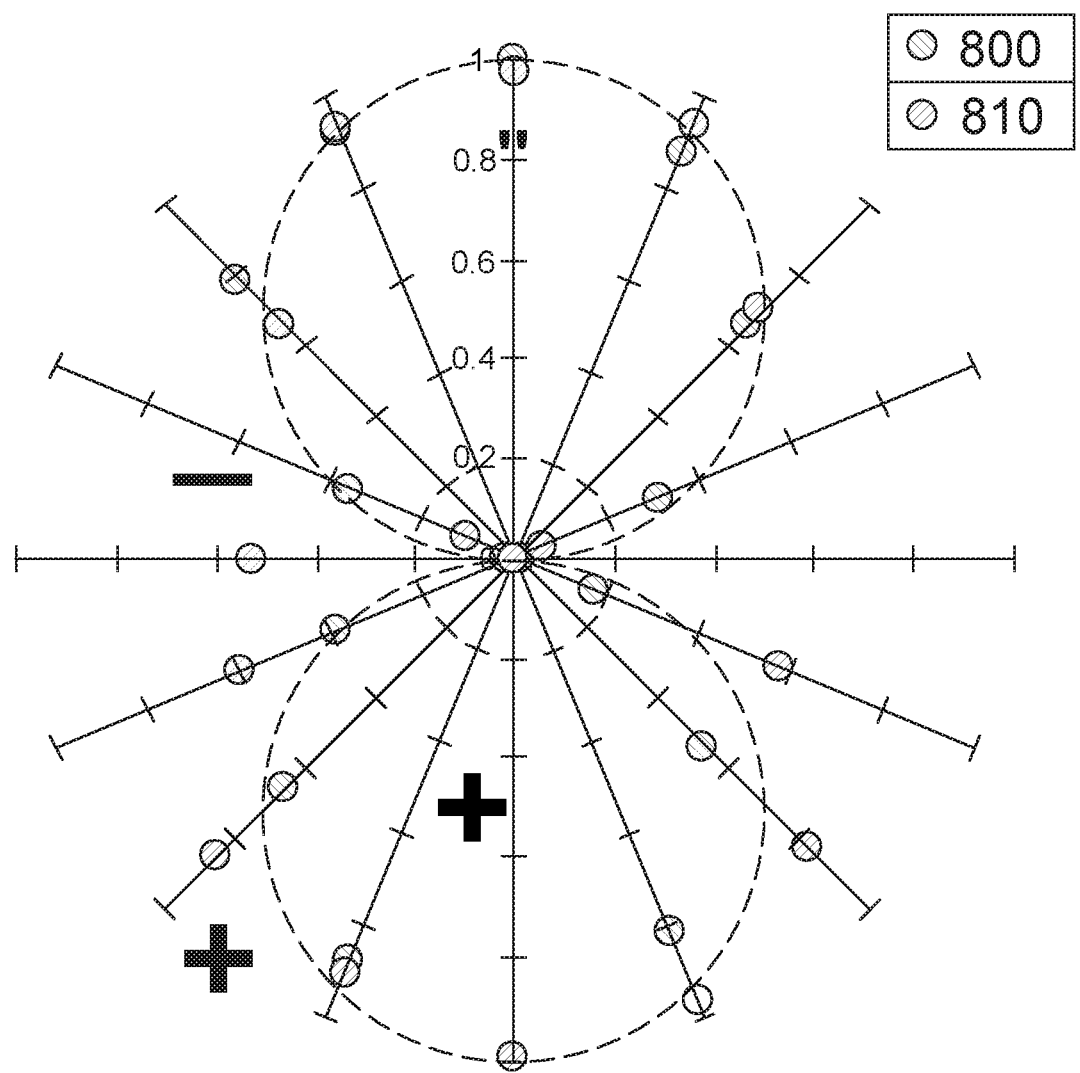

The magnetic sensing tool used in step 704 may be any magnetic sensor. Two different magnetic sensors have been tested for this application: a fluxgate magnetometer and a magnetic tunnel junction sensor. The tested fluxgate magnetometer had a length of 62 mm and a diameter of 16 mm. The tested magnetic tunnel junction sensor had a length of 63 mm and a diameter of 2.6 mm. Calibrations of the two sensors have been performed to explore the sensitivity and the directivity of both sensors. FIGS. 8A and 8B show the responses of the two sensors (magnetic tunnel junction sensor 800 and fluxgate magnetometer 810) along a main axis (i.e., longitudinal axis when placed in the well) at different distances from a small bar magnet. Both sensors have an acceptable resolution: sensor 800 has a resolution of approximate 0.002 Gauss, and sensor 810 has a resolution of about 0.01 Gauss. FIG. 8C shows the response of the sensors along a direction that is transverse to the main axis. FIG. 8D shows the directivity of the two sensors. It is noted in FIG. 8D that sensor 800 has a better directivity compared with sensor 810, which results from its very small cross section d=2 mm.

Based on the sensor calibration results shown in FIGS. 8A to 8D, the inventors have used the high-resolution sensor 800 for single sensor detection experiments and a multi-sensor torpedo probe (to be discussed later) was equipped with plural sensors 810.

Figure 9A:
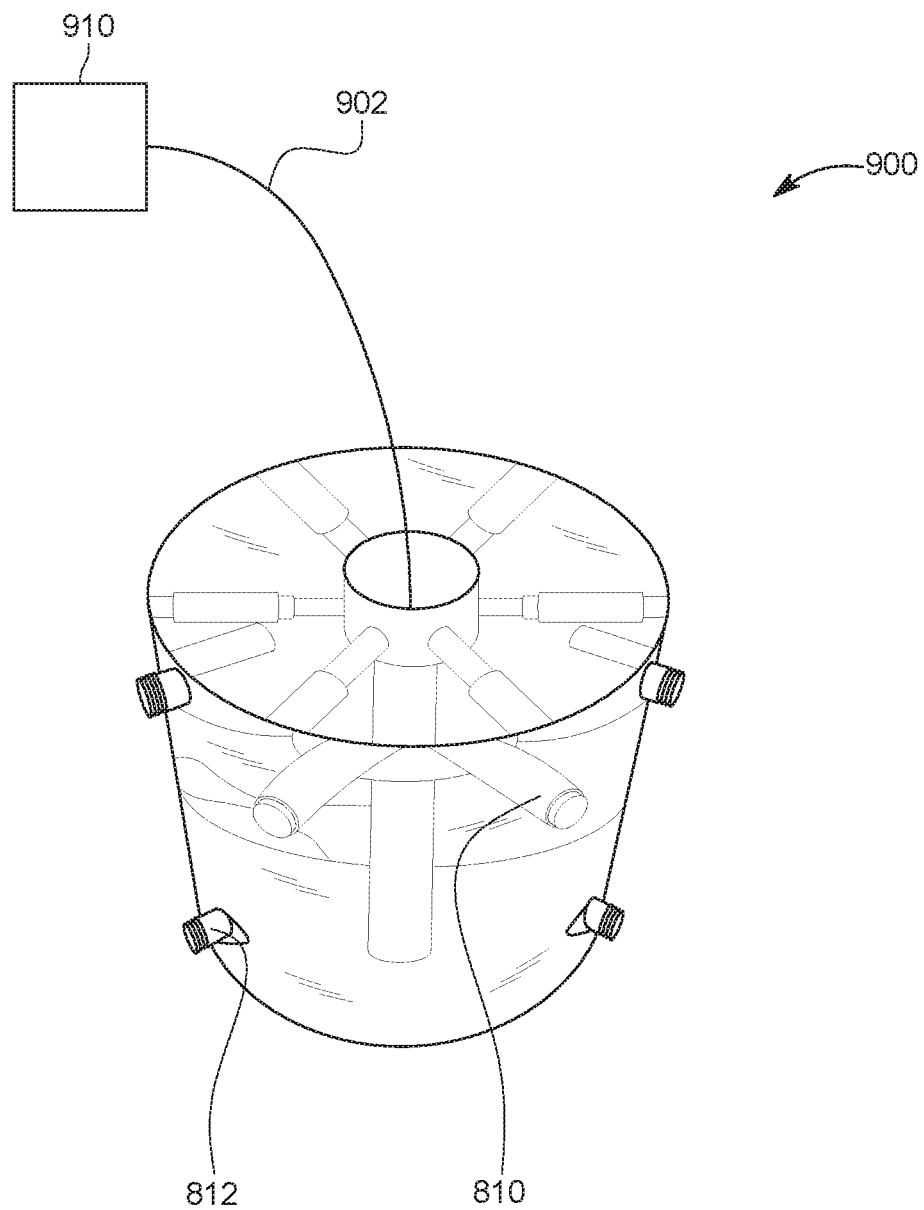
FIGS. 9A to 9C illustrate a torpedo probe used to measure qualities of a cement job in a concentric casing and an eccentric casing.

A torpedo probe 900, as shown in FIG. 9A, was equipped with seven fluxgate sensors 810 and it was designed and fabricated to conduct directional measurements of the magnetic field distribution along a cased borehole. More or less magnetic sensors may be used for the torpedo probe 900. In one embodiment, four sensors 810 are used. The torpedo probe 900 is connected with a cable 902 to a controller 910. The controller 910 may be located at the head of the well while the cable 902 is metered to lower the torpedo probe 900 into the well. Cable 902 may include plural conduits for communicating the measurements from each sensor to the controller 910. One sensor may be installed vertically to measure the vertical component of the magnetic field. There are six sensors 810 in this embodiment, that are equally spaced along a circumference of the torpedo probe 900 to obtain the horizontal components of the magnetic fields produced by the magnetic fluid located in the annulus space (between the casing and the wall of the well) and/or the formation around the casing. The diameter of the torpedo probe in this experiment was 115 mm, and the height of the torpedo probe was 100 mm. Six centralizers 812 (shown in FIG. 9A) were added to the exterior of the probe to ensure that the torpedo probe can run concentrically along the main axis of the casing.

Figure 9B:
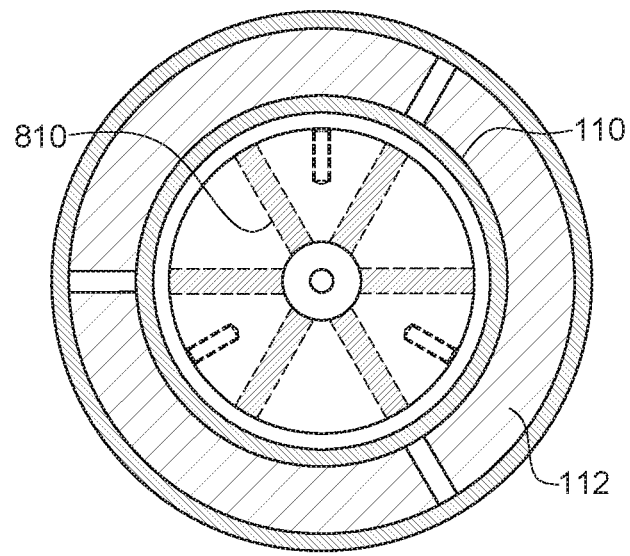
Figure 9C:
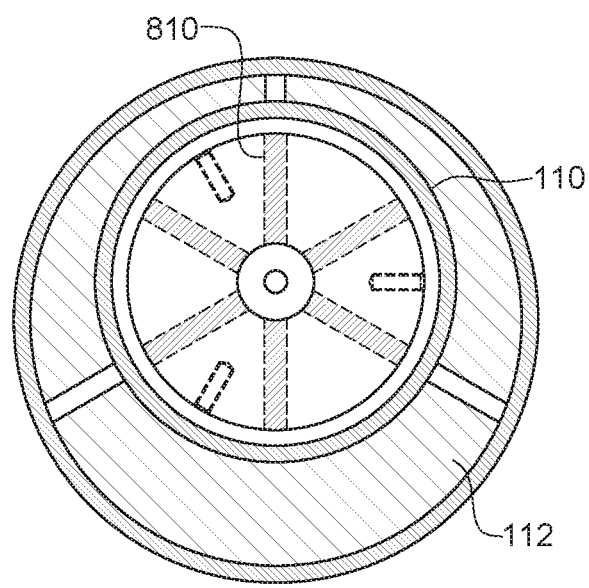

Two cased borehole models were constructed to simulate possible downhole geometries. A first casing was positioned concentric in the first model, as shown in FIG. 9B, and a second casing was positioned eccentric for the second model, as shown in FIG. 9C. The external cylinder (i.e., the wellbore) has an outer diameter OD=8" and an internal diameter ID=7.5"; the internal cylinder (i.e., the casing) has OD=5.5" and ID=5". In FIG. 9B, the internal cylinder is placed in the center to simulate the concentric casing condition, which has a uniform annulus space of thickness 2". In the eccentric casing model of FIG. 9C, the internal cylinder has an offset of 15 mm from the central line of the external cylinder. These cased borehole models were filled (1) with clean silica sand to represent the non-magnetic materials and (2) with a sand-iron power mixture, which represents the magnetic material. The multi-sensor torpedo 900 was run at a speed of 5 cm/s in each of the borehole models.

Figure 10A:
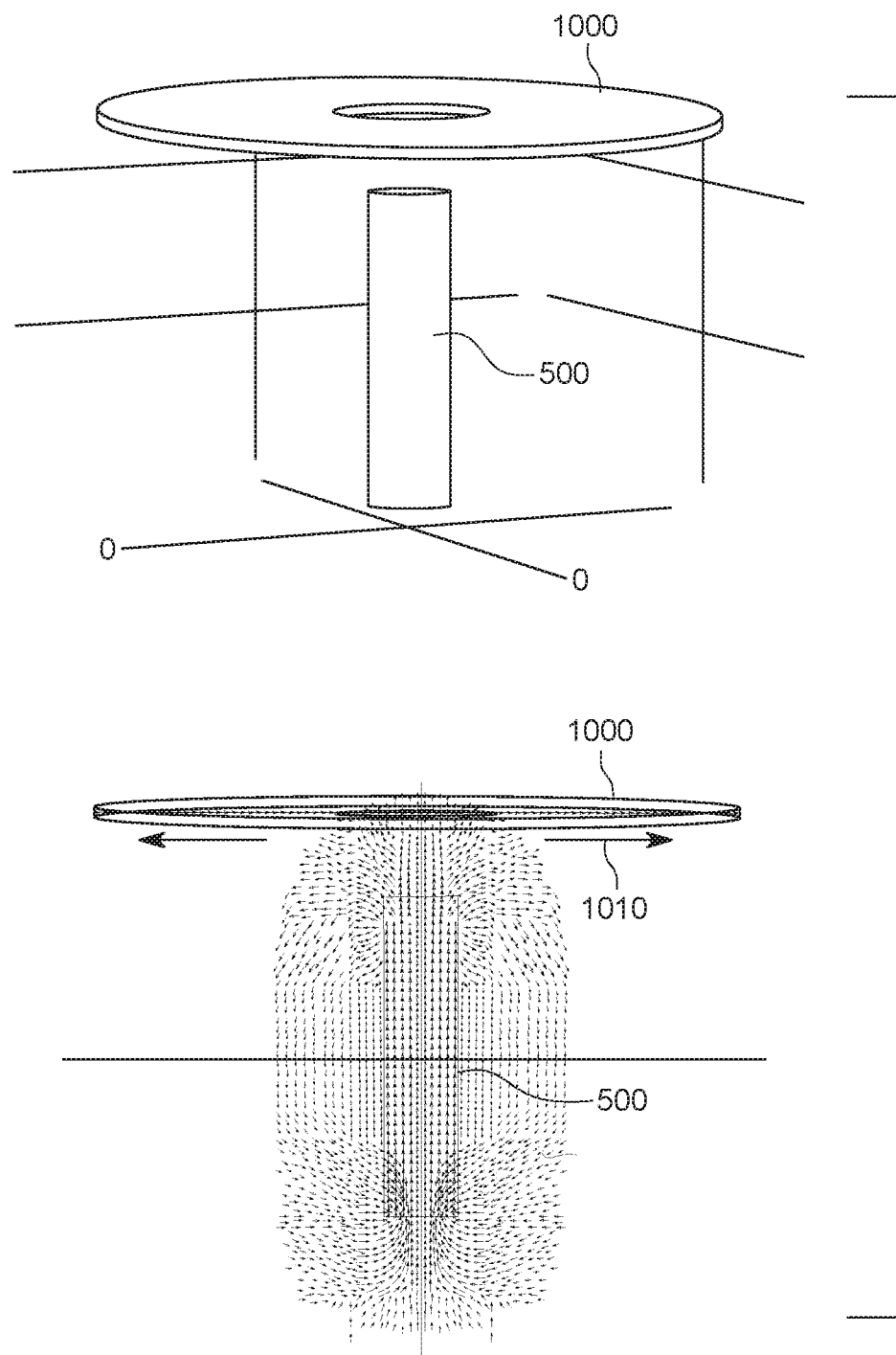
FIGS. 10A to 10C illustrate the magnetization of a fracturing plane in the presence of a magnet.
Figure 10B:
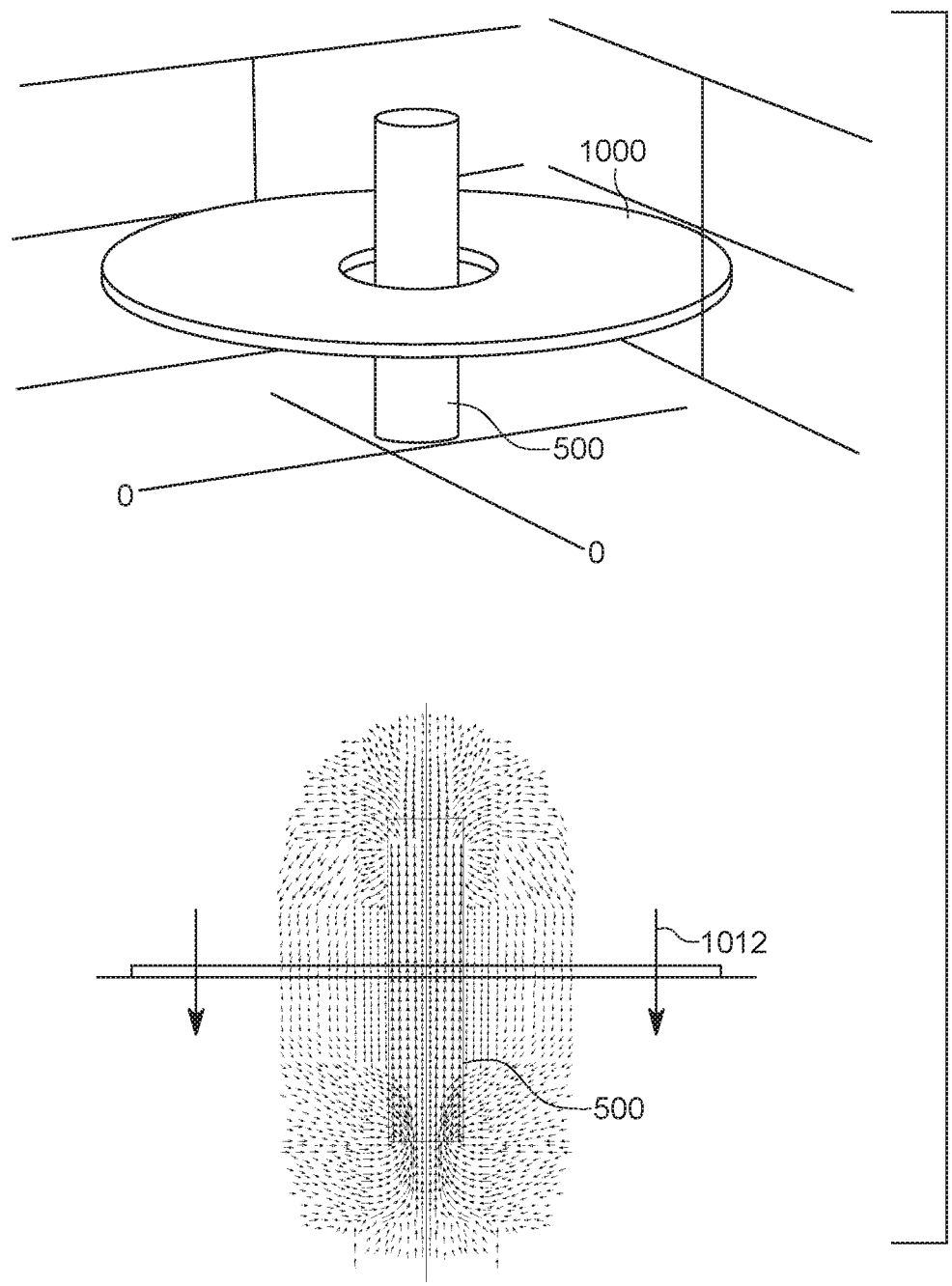
Figure 10C:
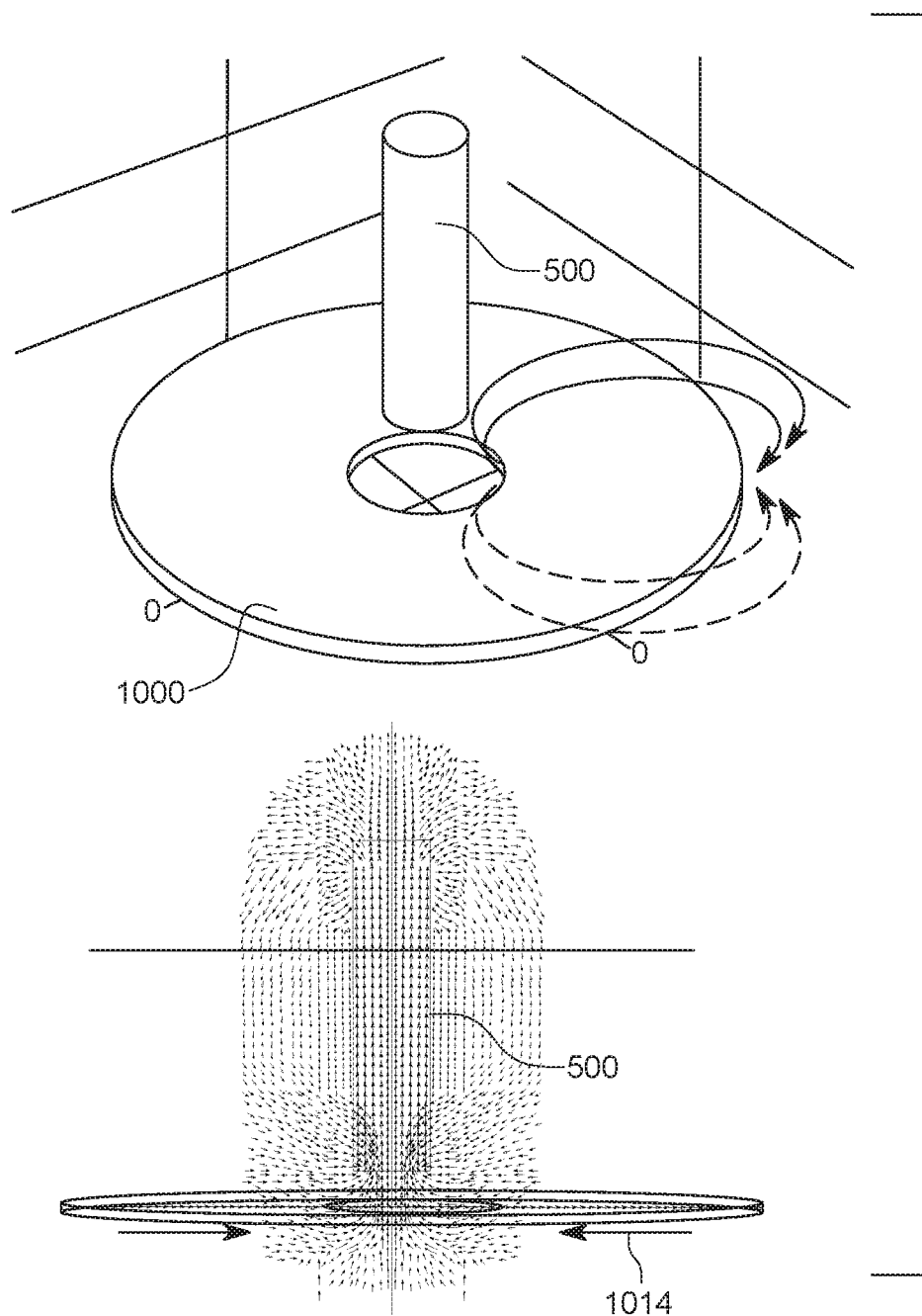

With this set up, a fracture detection operation has been performed. This operation assumes that a fracture formed in a cement work would be filled with the ferromagnetic material that is pumped into the well. When a permanent magnet/electromagnet 500 travels through a fracture 1000, as shown in FIGS. 10A to 10C, the fracture would be magnetized either radially or axially. When the magnet 500 is below the fracture 1000, as in FIG. 10A, the fracture 1000 is magnetized radially outward from the center, as indicated by the direction 1010 of the magnetic lines. When the magnet 500 is in the fracture plan 1000, the facture becomes axially magnetized as indicated by direction 1012. When the magnet 500 is moving above the fracture 1000, the fracture is radially magnetized, toward the center, as illustrated by direction 1014. Thus, only when the magnet 500 is in the plane of the fracture 1000, the fracture is axially magnetized. As the measurements are performed after the magnet has passed the fracture plane, the magnetic field lines in the fracture plane will always be oriented radially, as in FIG. 10C.

Figure 11:
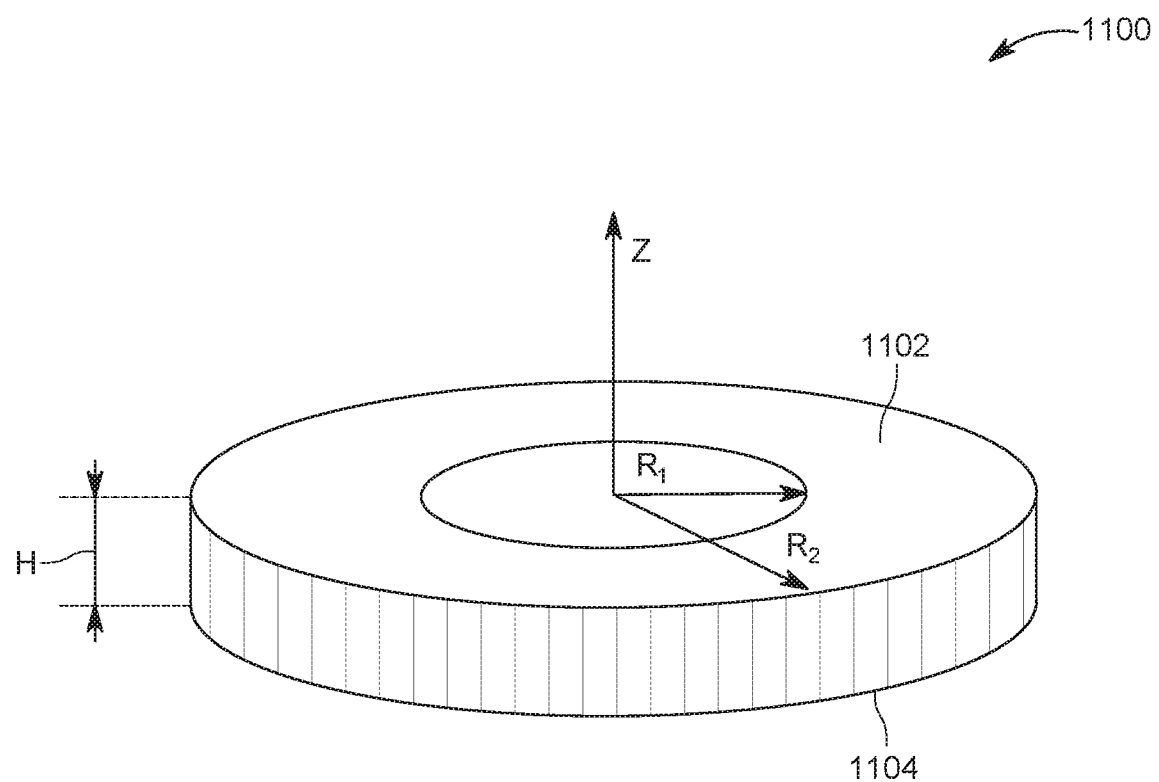
FIG. 11 illustrates the geometry of a fracturing plane.

To determine the location of the fracture plan, the axial field strength of a radially magnetized ferromagnetic fracture is now discussed. FIG. 11 shows an axially magnetized disk 1100 (which is assumed to describe the fracture). The inner radius of the disk is R1 and the outer radius is R2, and its thickness is h. The axis z is the axis of symmetry and it coincides, in an actual situation, with the gravity for a vertical well. The upper surface 1102 of the disk 1100 is charged with a surface magnetic pole density +σ* and the lower surface 1104 is charged with a surface magnetic pole density −σ*. The magnetic axial component of disk 1100 can then be expressed as follows:

$$B_z(z) = \frac{B_r}{2}\left(\frac{1}{a_1} - \frac{1}{a_2} - \frac{1}{b_1} + \frac{1}{b_2} + \ln\left[\frac{(1+b_1)(1+a_2)}{(1+b_2)(1+a_1)}\right]\right) \quad (2)$$

where

-continued $$a_1 = \sqrt{1 + \left(\frac{z+h}{R_2}\right)^2}, \; a_2 = \sqrt{1 + \left(\frac{z-h}{R_2}\right)^2},$$

$$b_1 = \sqrt{1 + \left(\frac{z+h}{R_1}\right)^2}, \; \text{and} \; b_2 = \sqrt{1 + \left(\frac{z-h}{R_1}\right)^2}.$$

Three fracture models ($R_2$=2, 6, and 8 cm) were prepared by painting the surface of the casing with a magnetic mud. A permanent magnet traveled along the central axis of the casing to magnetize the magnetic mud that simulates the fracture. Then a residual magnetic field strength was measured with sensor 800 along the central axis z. The magnet and the sensor were driven by a precision linear stage to have a constant speed.

Figure 12:
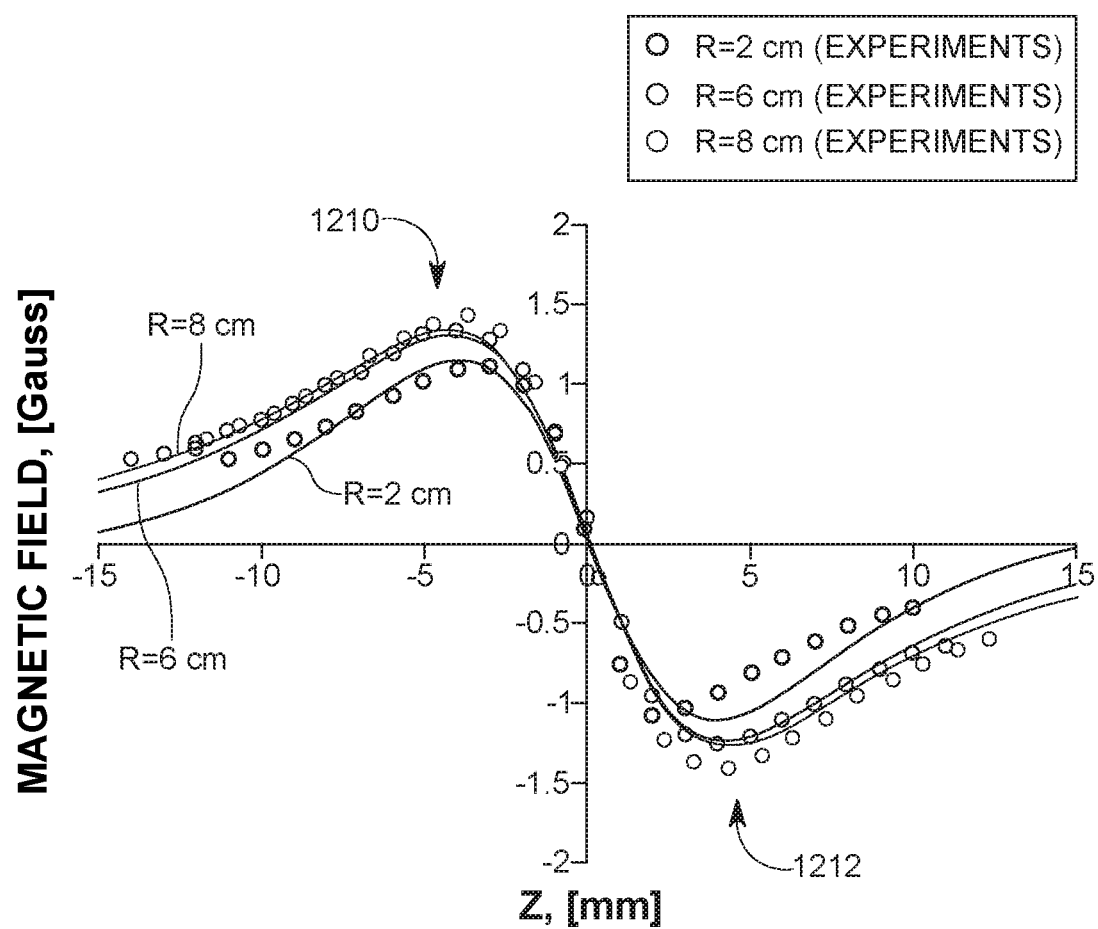
FIG. 12 illustrates the measured magnetic field when a magnetic sensor is moved past a fracturing plane.

FIG. 12 shows the measured (dots in the figure) magnetic field strength along the central axis z of the radially magnetized fracture models having the radius $R_2$ equal to 2, 6 and 8 cm and also their theoretical values (solid lines). It is noted that in the figure the magnetic field strength increases when the sensor approaches the plane of the fracture and reaches a first maximum 1210 when the sensor is closest to a first surface (e.g., surface 1102) of the plane of the fracture 1100 and reaches a second maximum 1212 when the sensor is closest to a second surface (e.g., surface 1104) of the plane of the fracture 1100. It is also noted that the vertical component of the magnetic field strength at the plane of the fracture is zero. The directions of the vertical component are opposite at two surfaces 1102 and 1104 of the plane of the fracture because the central symmetric feature of the magnetic field. This sharp transition of the magnetic field at the plane of fracture is used herein to recognize the existence of the fracture. The experimental results show a good agreement with the semi-analytical solutions introduced with regard to FIG. 11.

In general, larger fractures (radius) generate magnetic fields with larger magnitudes. However, the size (radius) of the fracture only has a significant influence on the field strength when the size of the fracture is relatively small. Due to the rapid decay of the magnetic field with distance, the influence of the fracture size becomes negligible when its size is relatively large.

Figure 13:
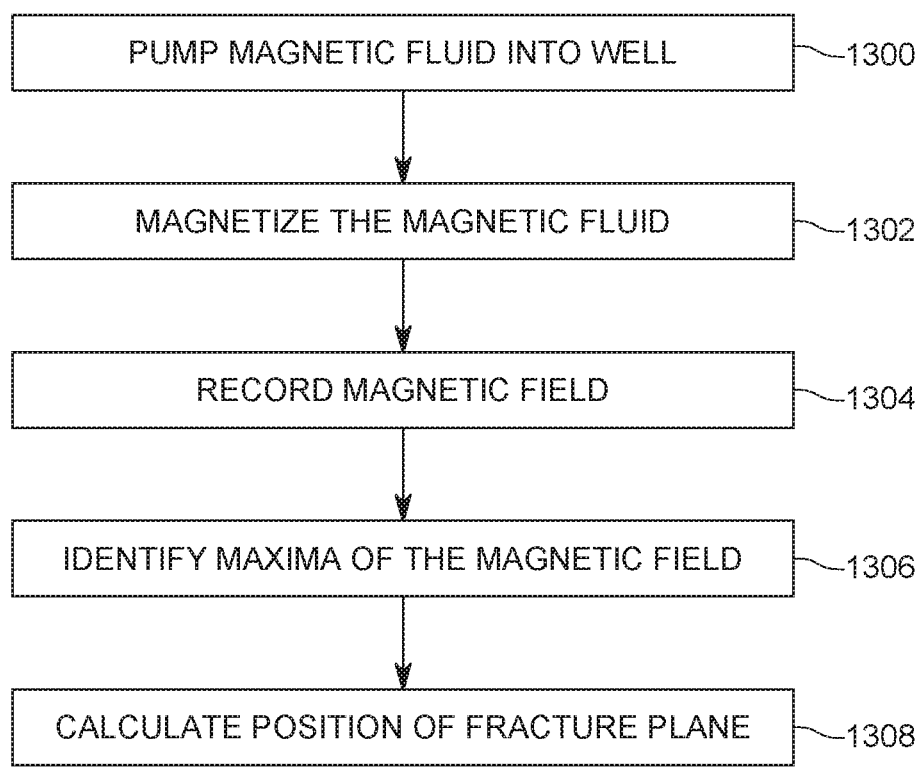
FIG. 13 is a flowchart of a method for determining a position of the fracturing plane.

A method for determining the location of a fracture is now discussed with regard to FIG. 13. In step 1300, a magnetic fluid is pumped into the well, to reach the annulus between the casing and the wall of the well, as previously discussed. In step 1302 a magnet (permanent or electromagnet) is lowered into the casing to magnetize the magnetic fluid. Then, in step 1304, a magnetic probe is lowered into the casing and records the magnetic field generated by the magnetic fluid. In this step, a location of the magnetic probe as a function of the depth z in the casing is also recorded. In step 1306, the maxima 1210 and 1212 are identified in the recorded data and in step 1308 the location of each fracturing plane is determined by averaging the z positions of the two adjacent maximums 1210 and 1212.

Figure 14:
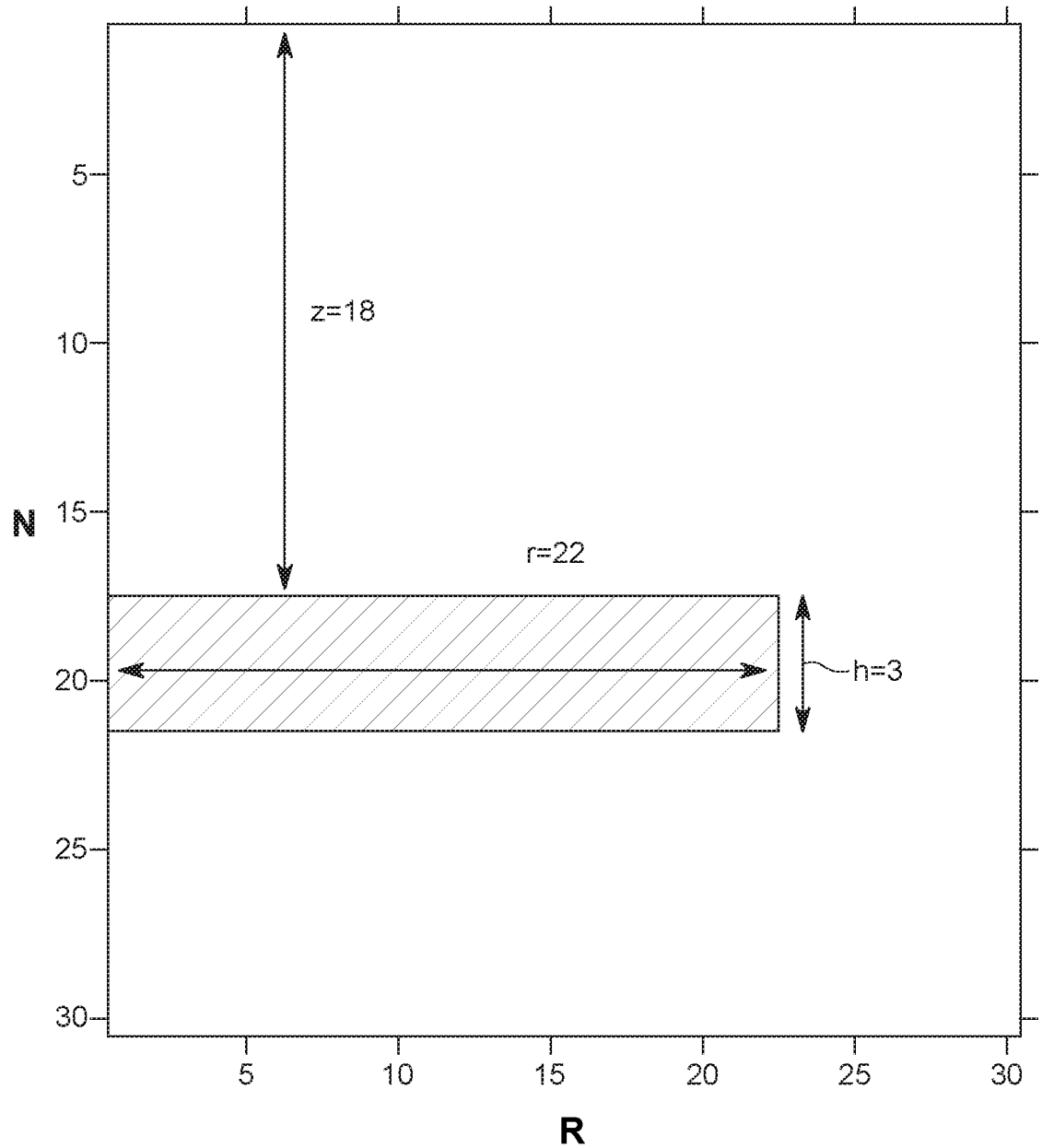
FIG. 14 illustrates a distribution of a magnetic fluid around a casing.

The magnetic fluid discussed above may also be used, together with the torpedo sensor 900 to determine the quality of a cement job. For this method, instead of calculating the location of the fracture, based on the maxima recorded with the magnetic probe, the measurement data from the torpedo sensor 900 is inverted to infer the distribution of the magnetic materials in the space around the casing. The inversion of the multi-sensor measurements is a 3-D inverse problem. However, considering the large number (at least 3, preferably 6, but also possible more than 6) of sensors along the perimeter of the torpedo probe, it is possible to actually calculate a 2-D inversion problem for each sensor. For the experiment to detect the quality of the cement job, the domain was selected to be 100 cm×10 cm. There are M=100 measurements (1 measurement per cm) and N=1,000 unknowns (voxel dimension 1 cm×1 cm) for the measured space. The number of unknowns are much greater than the number of measurements. While a larger voxel size reduces the number of unknowns, it also causes a decrease in resolution. Therefore, a parametric representation is adopted here to reduce the number of unknowns and use successive forward simulations to solve for all the parameters. FIG. 14 shows that the space distribution of the magnetic fluid around the annulus, between the casing and the wall of the well, can be represented by a rectangle having dimensions r×h, where the rectangle is located at a position z. In FIG. 14, h is the thickness of the magnetic formation and r is a depth of the magnetic formation. A rectangle is used to represent the actual 2D geometry of the magnetic formation.

Figure 15:
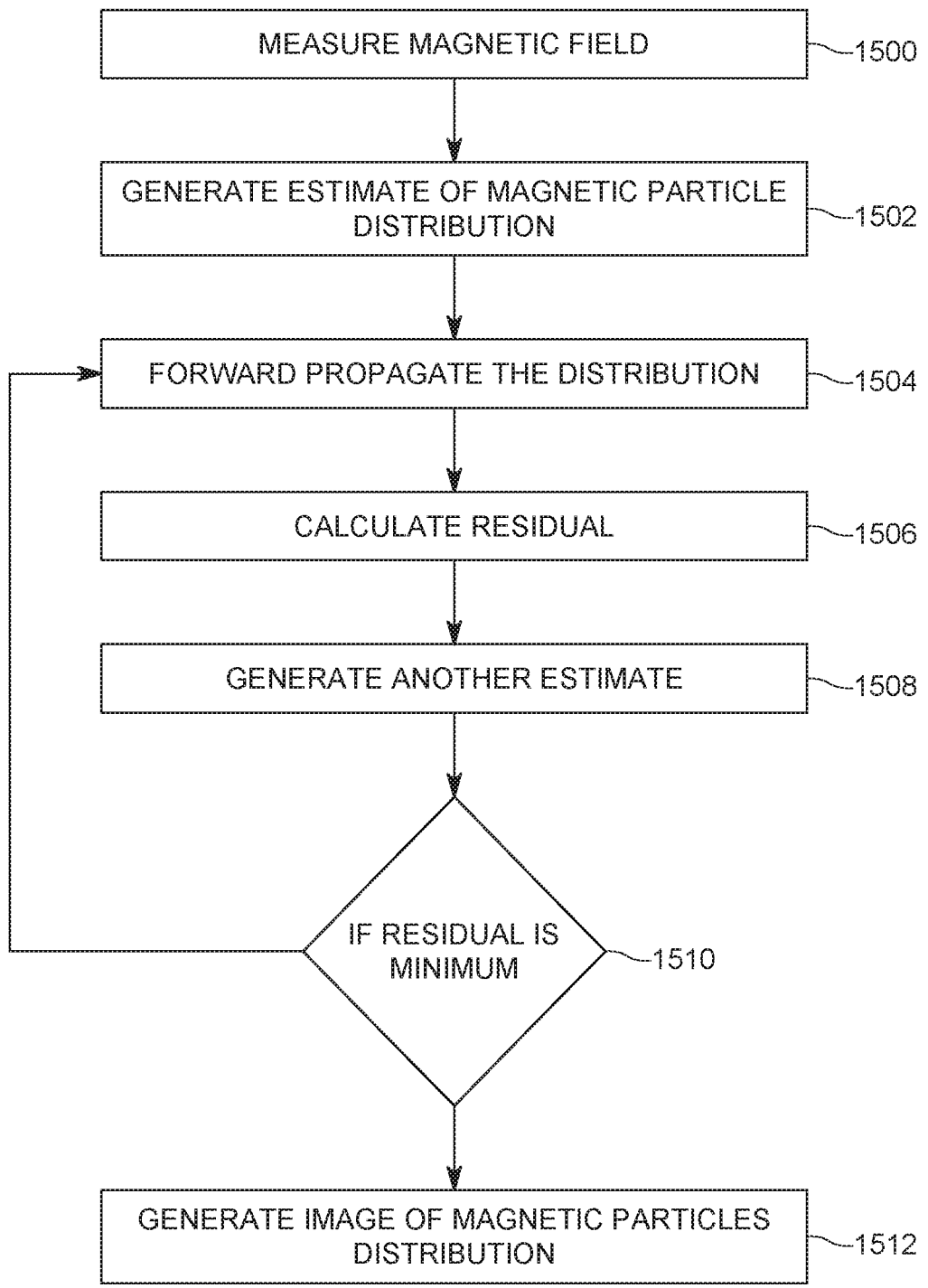
FIG. 15 is a flowchart of a method for evaluating qualities of a cementing completion job.

A procedure for successive forward simulation is described with regard to FIG. 15 and includes a step 1500 of measuring the magnetic field $\underline{y}^{<meas>}$ in the casing with the torpedo probe, a step 1502 of generating an estimate of the solution $\underline{x}^{<est>}$ (the solution $\underline{x}^{<est>}$ is generated in the anulus), a step 1504 of using a forward simulation to compute $\underline{y}^{<pred>}=f(\underline{x}^{<est>})$ based on the estimate of the solution (the prediction $\underline{y}^{<pred>}$ is calculated in the casing), a step 1506 of determining a residual between $\underline{y}^{<pred>}$ and $\underline{y}^{<meas>}$ (both of which were considered inside the casing), a step 1508 of generating another estimate of the solution and then repeating the previous steps until the residual is minimum and a physically meaningful estimate is found that adequately justifies the measured data. Then, a determination is made in step 1510 whether the residual is at a minimum. If the answers is no, then the method returns to step 1504. If the answer is yes, the method advances to step 1512 and an estimate image of the cement in the annulus space is generated.

The forward simulation step 1504 is discussed now in more detail. The axial and radial components of a magnetic field of a magnetic dipole are given by:

$$B_z(r) = \frac{\mu_0}{4\pi} m_1 \left( \frac{3\cos^2\theta - 1}{r^3} \right), \text{ and} \quad (3)$$

$$B_x(r) = \frac{\mu_0}{4\pi} m_1 \left( \frac{3\cos\theta\sin\theta}{r^3} \right), \quad (4)$$

where $m_1$ is the magnetic strength of the dipole.

Based on equations (3) and (4), the method calculates a response map for the torpedo probe. Similar to the electric fields, the superposition principle applies to the magnetic fields, causing the total field strength to equal the vector sum of multiple individual fields due to the magnets in the magnetic material. Therefore, a big irregular magnetic material that is found in the cement job can be treated as the superposition of multiple small magnetic dipoles, where each dipole's magnetic field is described by equations (3) and (4).

The residuals discussed in step 1506 are now discussed. In one application, the $L_2$ error norm is used to estimate the residuals for the inverse algorithm. For example, the following equation may be used to calculate the residuals:

$$S = \sum_{i=1}^{n} (y_i - f(x_i))^2, \quad (5)$$

where $y_i$ is the measured magnetic field, $x_i$ is an estimated solution, and $f(x_i)$ is the propagated magnetic field.

Figure 16A:
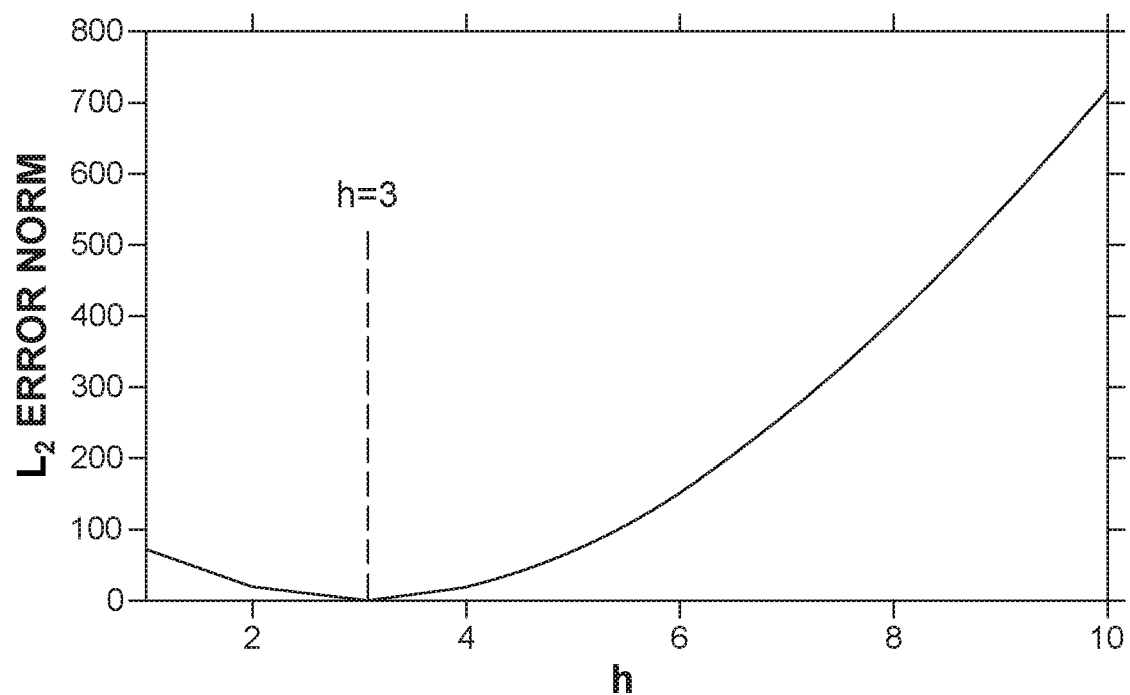
FIGS. 16A to 16C illustrate an error norm of various parameters associated with a magnetic fluid present in the cement job.
Figure 16B:
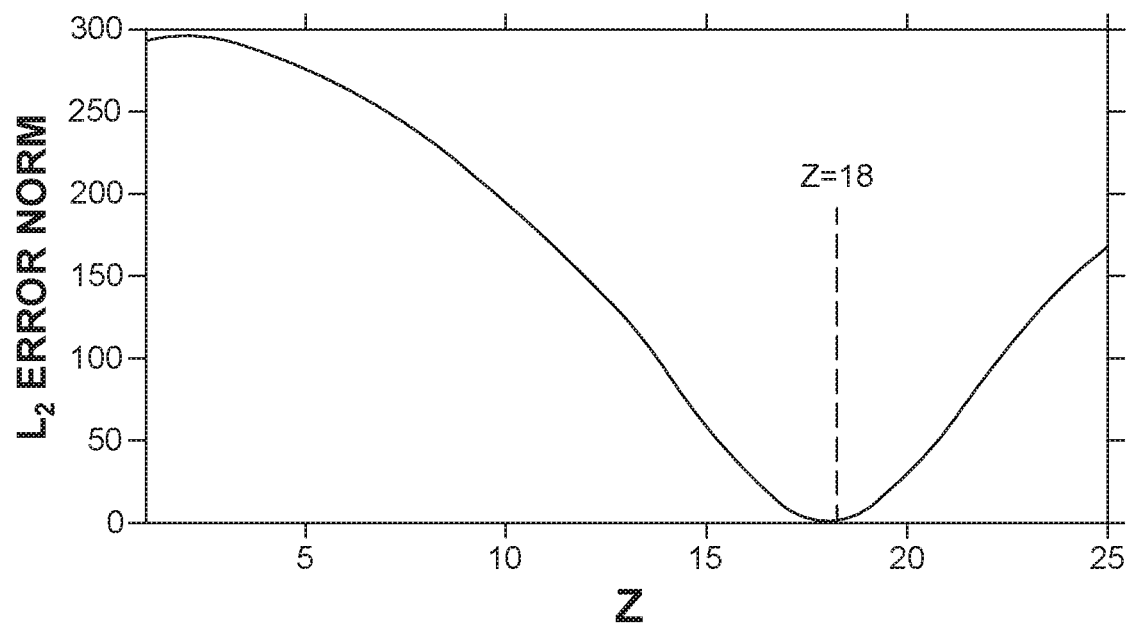
Figure 16C:
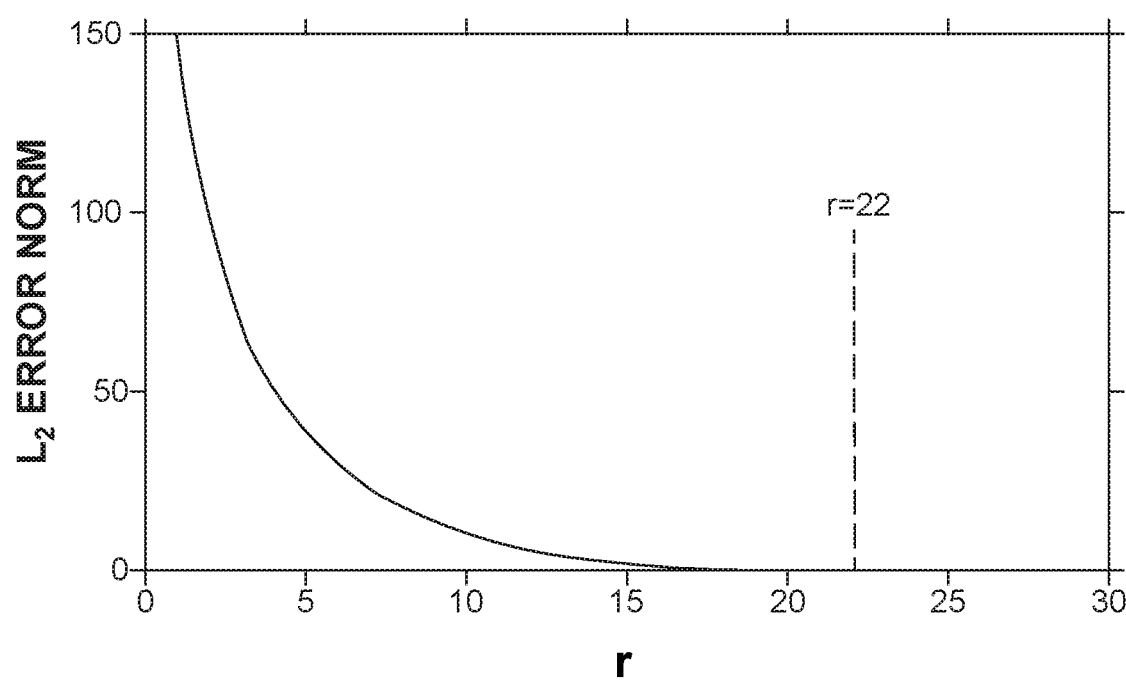

The forward simulation function f may be applied to three parameters for the method of FIG. 15. For example, the three parameters may be quantities h, z, and r illustrated in FIG. 14. After the forward function f is applied to these quantities in step 1504, the residuals between the simulations and measurements are calculated in step 1506 with the $L_2$ error norm defined in equation (5). FIGS. 16A to 16C present the $L_2$ error norm for a magnetic pocket in a cement job with z=18 mm, r=22 mm, and h=3 mm. The residuals in FIGS. 16A to 16C show that the thickness h of the magnetic pocket and the position z along the vertical of the magnetic pocket could be properly determined because the residuals show a clear peak value. However, the length r decays smoothly with the distance from the wellbore, which makes it is difficult to accurately estimate the value of r.

Figure 17A:
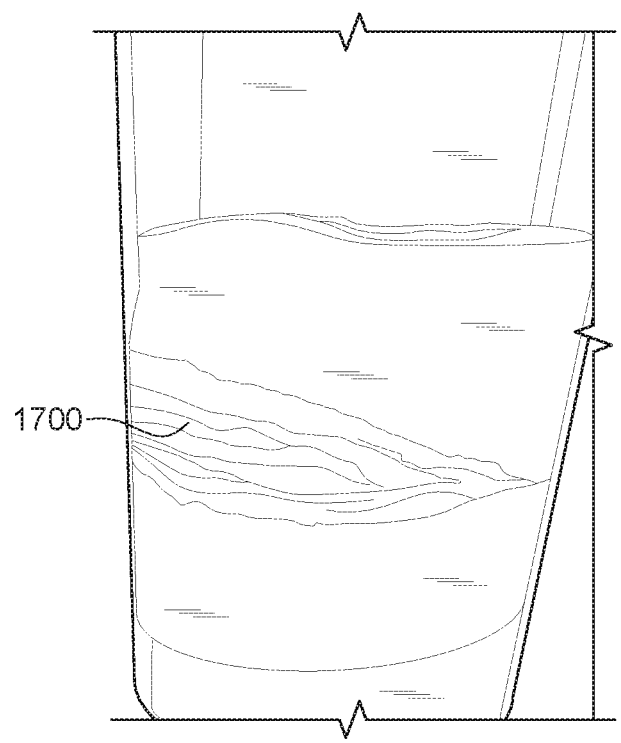
FIGS. 17A to 17C illustrate an experiment in which there is a mud channel of a magnetic fluid in a cementing job and how the method proposed herein detects the mud channel of magnetic fluid.
Figure 17B:
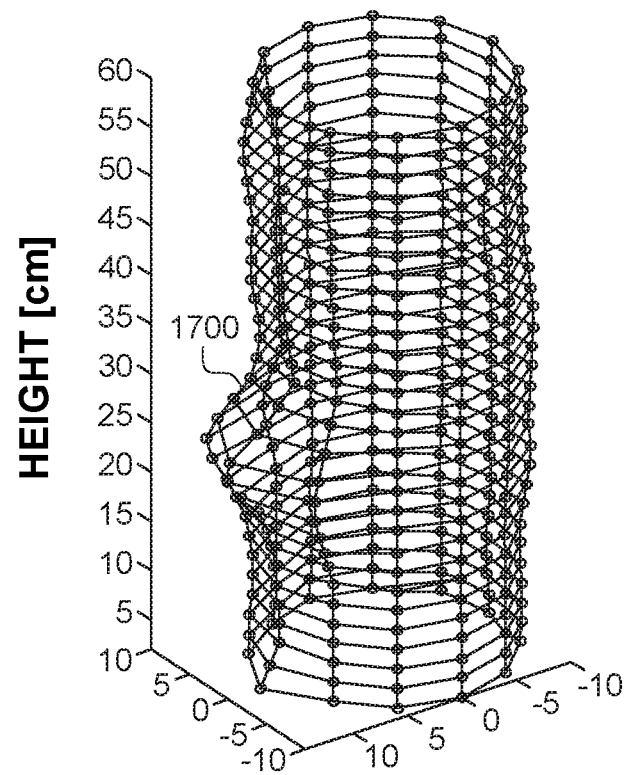
Figure 17C:
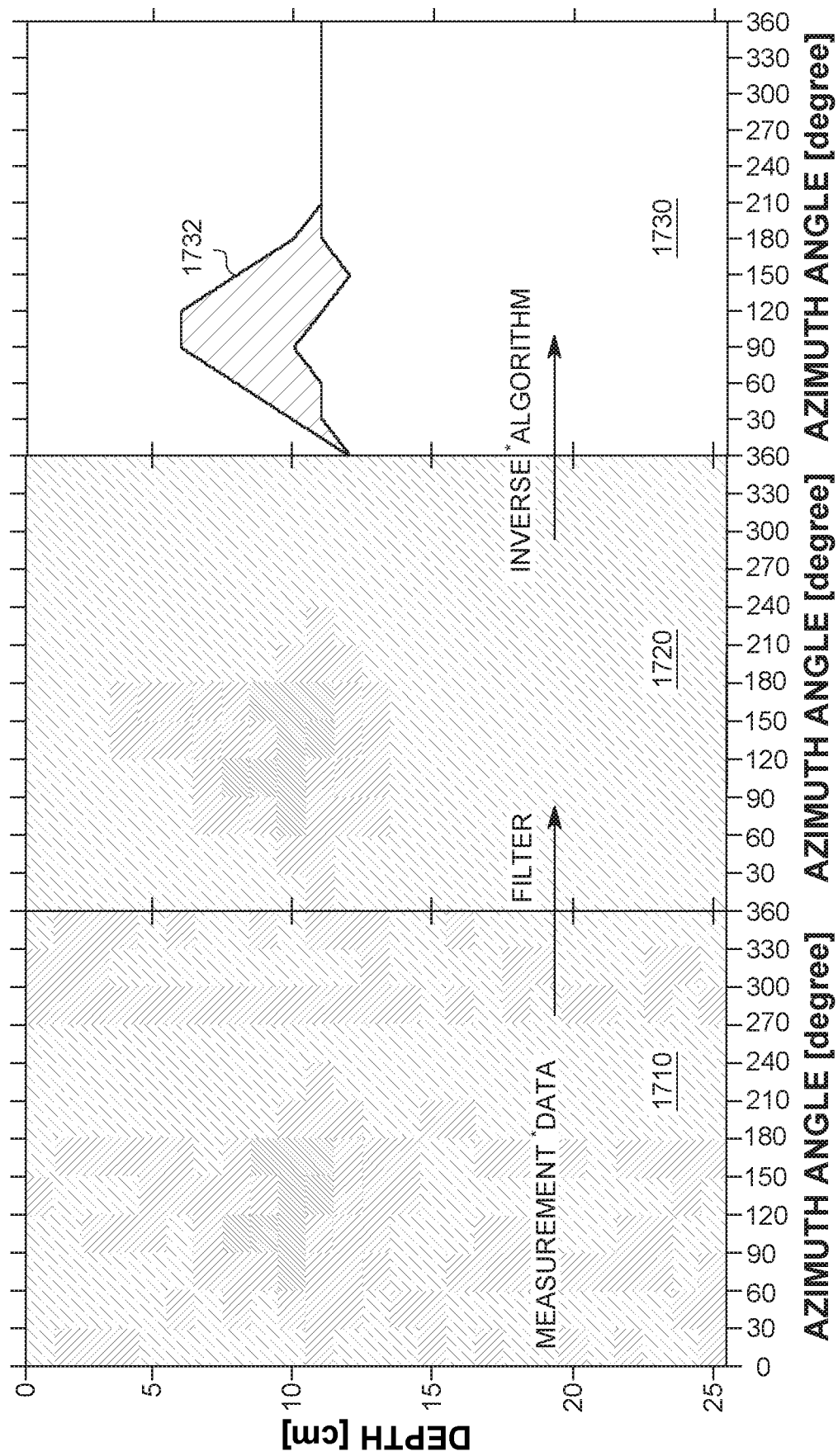

The algorithms discussed above have been tested for two different cases, as now discussed. In the first case, the eccentric casing model illustrated in FIG. 9C was filled with clean sand and sand-iron mixture (10% iron particle) to simulate a mud channel 1700 in a narrow side of the annulus, between the casing and the wall of the well, as illustrated in FIG. 17A. The raw measurement results obtained from 12 different directions were plotted in FIG. 17B in a cylindrical coordinate system. It can be seen that the spatial distribution of the magnetic materials of the mud channel can be identified from the raw data. However, the inverse algorithm of FIG. 15 was applied to the raw data, after filtering signals below a certain amplitude, to improve the signal-to-noise ratio. FIG. 17C illustrates the transition from the raw data 1710 to filtered data 1720 and then to the solved spatial distribution 1730 of the magnetic materials 1732. The magnetic materials 1732 present in the annulus between the casing and the wall of the well are clearly visible in the processed data 1730.

Figure 18A:
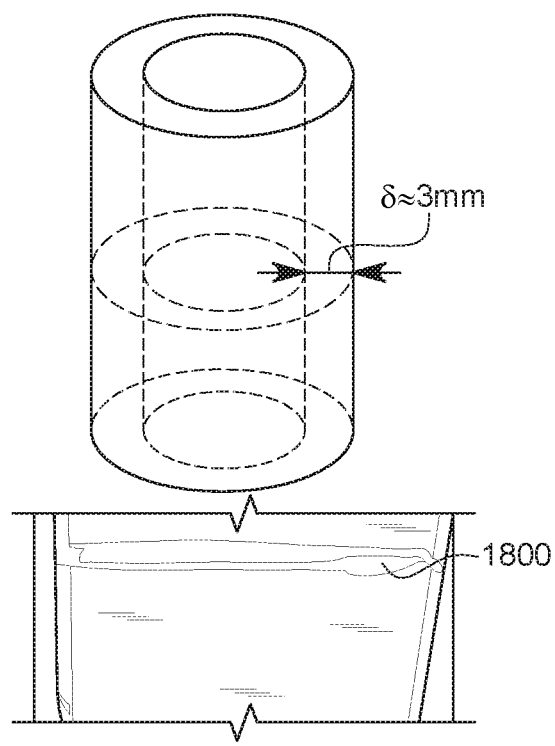
FIGS. 18A to 18C illustrate an experiment in which there is a layer of magnetic particles in a cementing job and how the method proposed herein detects the layer of magnetic particles.
Figure 18B:
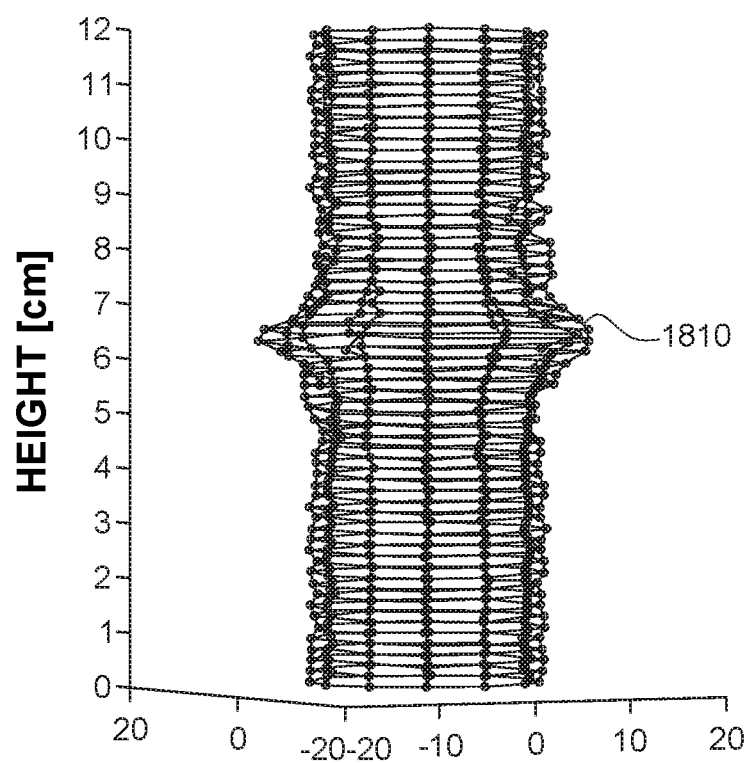
Figure 18C:
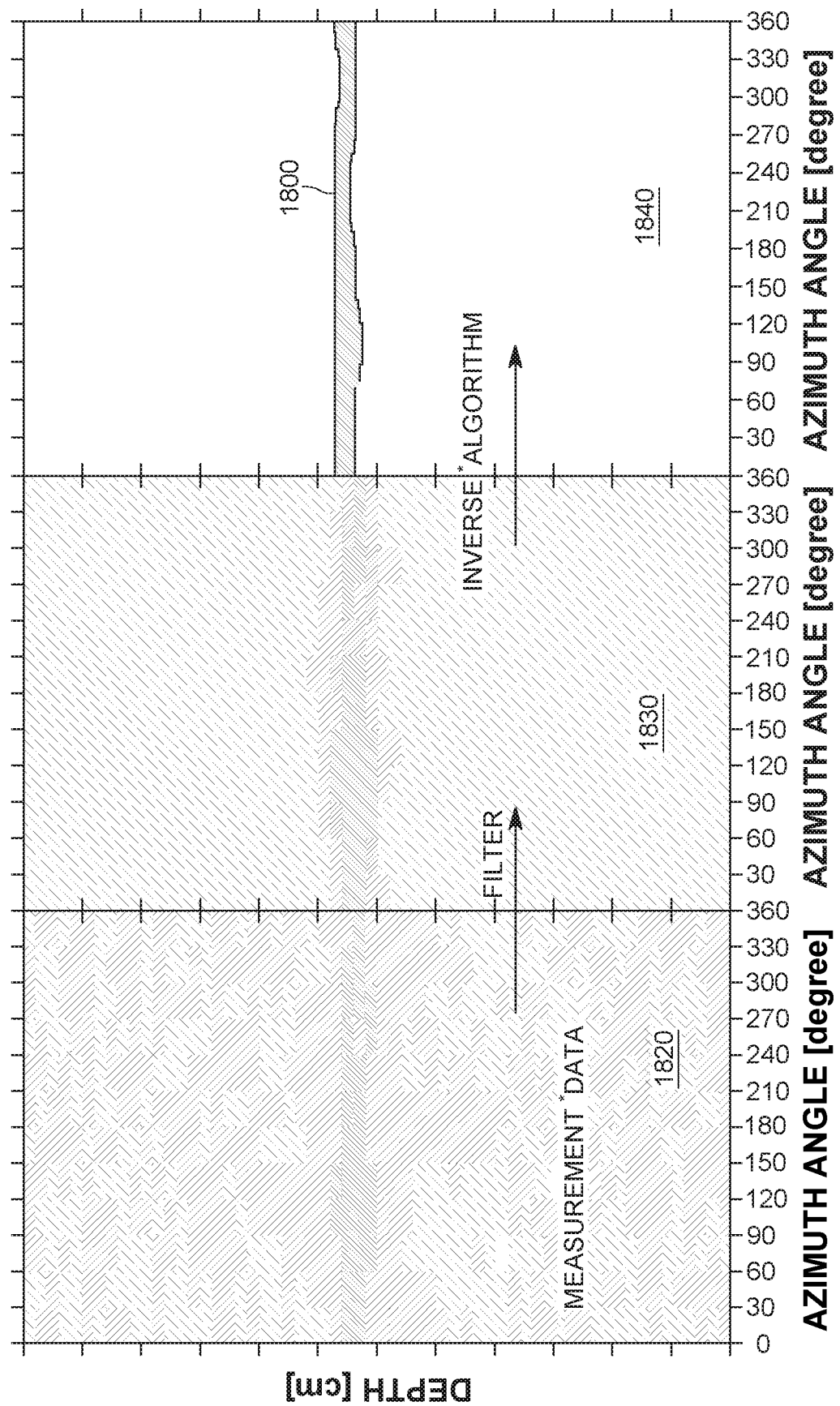

For the second case, FIG. 18A shows an experimental setup of a thin layer 1800 of sand-iron mixture in the concentric cased borehole model of FIG. 9B. A thickness of the annulus between the casing and the wall of the well is about δ=3 mm. The raw data collected with the torpedo probe 900 is illustrated in FIG. 18B. Again, the raw data already shows the location 1810 of the thin layer 1800. However, when the inversion algorithm is applied to the measured data 1820 as illustrated in FIG. 18C, the resulting spatial distribution 1840 of the magnetic material clearly identifies the thin layer 1800. Note that FIG. 18C also show the filtered data 1830, which is obtained prior to performing the inversion algorithm. This experiment reveals the high spatial resolution of the new logging tool. This new magnetic logging tool is able to capture the magnetic field generated by a δ=3 mm layer of a magnetic material.

The disclosed embodiments provide methods and systems for identifying a distribution of magnetic particles in a well, outside of a casing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for investigating well integrity, the method comprising:
   pumping a magnetic fluid into an annulus of the well;
   magnetizing with a magnet the magnetic fluid while in the annulus of the well;
   moving a magnetic sensing probe through a casing of the well and recording a magnetic field generated by the magnetic fluid;
   processing the recorded magnetic field to determine a distribution of magnetic particles into the magnetic fluid in the annulus;
   determining two adjacent maxima in the recorded magnetic field; and
   identifying a location of a fracturing plane that includes the magnetic fluid as being at a location half way between the two adjacent maxima.

2. The method of claim 1, wherein the magnetic fluid includes a mud and the magnetic particles.

3. The method of claim 1, wherein the annulus is formed between the casing and a wall of the well.

4. The method of claim 1, further comprising:
   pumping a cement into the annulus to complete the well.

5. The method of claim 1, further comprising:
   simultaneously recording the magnetic field generated by the magnetic fluid with plural magnetic sensors.

6. The method of claim 5, further comprising:
   estimating a magnetic field inside the annulus, produced by the magnetic fluid;
   applying an inverse algorithm to the estimated magnetic field to calculate a predicted magnetic field inside the casing; and
   minimizing a residual magnetic field between the measured magnetic field inside the casing and the predicted magnetic field.

7. The method of claim 6, further comprising:
   generating an image of a distribution of the magnetic particles in the magnetic fluid based on the residual magnetic field.

8. The method of claim 6, wherein the estimated magnetic field is calculated in the annulus using a dipole magnetic moment model.

9. The method of claim 1, wherein the magnetic sensing probe has plural magnetic sensors.

10. The method of claim 9, wherein the plural magnetic sensors are distributed equidistantly along an external periphery of the magnetic probe.

11. A magnetic probe system for investigating well integrity, the magnetic probe system comprising:
    a magnetic probe configured to record a magnetic field generated by a magnetic fluid within an annulus associated with a casing in a well;
    a controller configured to determine two maxima in the recorded magnetic field, and identify a location of a fracturing plane that includes the magnetic fluid, as being at a location half way between the two maxima; and
    a cable connecting the magnetic probe to the controller,
    wherein the magnetic probe includes plural magnetic sensors equally distributed along an external circumference of the magnetic probe.

12. The magnetic probe system of claim 11, wherein the controller is configured to process the recorded magnetic fields to determine a distribution of magnetic particles into the magnetic fluid distributed around the annulus.

13. The magnetic probe system of claim 12, wherein the plural magnetic sensors are configured to simultaneously record the magnetic field generated by the magnetic fluid.

14. The magnetic probe system of claim 13, wherein the controller is configured to estimate a magnetic field inside the annulus, produced by the magnetic fluid, apply an inverse algorithm to the estimated magnetic field to calculate a predicted magnetic field inside the casing, and minimize a residual magnetic field between the measured magnetic field inside the casing and the predicted magnetic field.

15. The magnetic probe system of claim 14, wherein the controller is further configured to generate an image of a distribution of the magnetic particles in the magnetic fluid based on the residual magnetic field.

16. The magnetic probe system of claim 14, wherein the estimated magnetic field is calculated in the annulus using a dipole magnetic moment model.

* * * * *